US010725788B1

United States Patent
Yallouz et al.

(10) Patent No.: US 10,725,788 B1
(45) Date of Patent: Jul. 28, 2020

(54) ADVANCED ERROR DETECTION FOR INTEGER SINGLE INSTRUCTION, MULTIPLE DATA (SIMD) ARITHMETIC OPERATIONS

(71) Applicant: Intel Corporation, Santa Clara, CA (US)

(72) Inventors: Jose Yallouz, Mehoz Haifa (IL); Arkady Bramnik, Kiryat Motzkin (IL); Ron Gabor, Herzliya (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/363,540

(22) Filed: Mar. 25, 2019

(51) Int. Cl.
*G06F 9/38* (2018.01)
*G06F 9/30* (2018.01)

(52) U.S. Cl.
CPC .......... *G06F 9/3887* (2013.01); *G06F 9/3001* (2013.01); *G06F 9/3016* (2013.01); *G06F 9/30036* (2013.01)

(58) Field of Classification Search
CPC .. G06F 9/3887; G06F 9/3001; G06F 9/30036; G06F 9/3016
See application file for complete search history.

(56) References Cited

U.S. PATENT DOCUMENTS

| | | | |
|---|---|---|---|
| 2005/0283769 A1* | 12/2005 | Eichenberger | G06F 8/4452 717/151 |
| 2005/0283773 A1* | 12/2005 | Eichenberger | G06F 8/4441 717/151 |
| 2007/0294506 A1* | 12/2007 | Ross | G06F 12/0897 711/216 |
| 2008/0127059 A1* | 5/2008 | Eichenberger | G06F 8/43 717/106 |
| 2013/0246737 A1* | 9/2013 | Eichenberger | G06F 9/30021 712/201 |
| 2016/0124651 A1* | 5/2016 | Sankaranarayanan | G06F 9/3004 711/130 |
| 2016/0231798 A1* | 8/2016 | Gendler | G06F 1/3203 |

(Continued)

OTHER PUBLICATIONS

Wu, H., et al., "Compiling SIMT Programs on Multi- and Many-core Processors with Wide Vector Units: A Case Study with CUDA", 2018 IEEE 25th International Conference on High Performance Computing (HiPC), Conference Location: Bengaluru, India, Date of Conference: Dec. 17-20, 2018, pp. 123-132. (Year: 2018).*

*Primary Examiner* — Kyle Vallecillo
(74) *Attorney, Agent, or Firm* — Nicholson De Vos Webster & Elliott LLP

(57) ABSTRACT

A method includes calculating, by a processor core, a first residue code of a first packed vector stored in a first vector register of a set of vector registers; calculating a second residue code of a second packed vector stored in a second vector register of the set of vector registers; calculating, from an addition of the first residue code and the second residue code, a reference residue code for a SIMD arithmetic operation; performing an element-by-element execution of the SIMD arithmetic operation between data elements of the first packed vector and of the second packed vector, resulting in an output packed vector; calculating an output residue code of the output packed vector; and detecting an error in the SIMD arithmetic operation based on comparison of the reference residue code with the output residue code.

21 Claims, 18 Drawing Sheets

(56) References Cited

U.S. PATENT DOCUMENTS

| | | | |
|---|---|---|---|
| 2017/0177350 A1* | 6/2017 | Ould-Ahmed-Vall | ........................ G06F 9/30036 |
| 2017/0177351 A1* | 6/2017 | Ould-Ahmed-Vall | ........................ G06F 9/30036 |
| 2017/0177353 A1* | 6/2017 | Ould-Ahmed-Vall | ........................ G06F 9/30018 |
| 2020/0073662 A1* | 3/2020 | Rasale | ................ G06F 9/30036 |

* cited by examiner

210 PACKED BYTE

220 PACKED WORD

230 PACKED DOUBLEWORD

240 PACKED QUADWORD

| 127 | 120 119 | 112 111 | 104 103 | 24 23 | 16 15 | 8 7 | 0 |
|---|---|---|---|---|---|---|---|
| bbbb bbbb | bbbb bbbb | bbbb bbbb | • • • | bbbb bbbb | bbbb bbbb | bbbb bbbb | |

244 — UNSIGNED PACKED BYTE REPRESENTATION

| 127 | 120 119 | 112 111 | 104 103 | 24 23 | 16 15 | 8 7 | 0 |
|---|---|---|---|---|---|---|---|
| sbbb bbbb | sbbb bbbb | sbbb bbbb | • • • | sbbb bbbb | sbbb bbbb | sbbb bbbb | |

245 — SIGNED PACKED BYTE REPRESENTATION

| 127 | 112 111 | 16 15 | 0 |
|---|---|---|---|
| wwww wwww wwww wwww | • • • | wwww wwww wwww wwww | |

246 — UNSIGNED PACKED WORD REPRESENTATION

| 127 | 112 111 | 16 15 | 0 |
|---|---|---|---|
| swww wwww wwww wwww | • • • | swww wwww wwww wwww | |

247 — SIGNED PACKED WORD REPRESENTATION

| 127 | 92 91 | 32 31 | 0 |
|---|---|---|---|
| dddd dddd dddd dddd dddd dddd dddd dddd | • • • | dddd dddd dddd dddd dddd dddd dddd dddd | |

248 — UNSIGNED PACKED DOUBLEWORD REPRESENTATION

| 127 | 92 91 | 32 31 | 0 |
|---|---|---|---|
| sddd dddd dddd dddd dddd dddd dddd dddd | • • • | sddd dddd dddd dddd dddd dddd dddd dddd | |

249 — SIGNED PACKED DOUBLEWORD REPRESENTATION

ADVANCED ERROR DETECTION FOR INTEGER SINGLE INSTRUCTION, MULTIPLE DATA (SIMD) ARITHMETIC OPERATIONS

TECHNICAL FIELD

The disclosure relates to error detection in arithmetic operations by a computing system, and more particularly, to advanced error detection for integer single instruction, multiple data (SIMD) arithmetic operations.

BACKGROUND

Residue codes are arithmetic error detection codes, e.g., a code preserved under a set of arithmetic operations by a computing system. Use of residue codes enables the detection of errors that may occur in the computing system during the execution of an arithmetic operation with a relatively low overhead use of resources. In order to parallelize processor code, the usage of a single instruction over multiple data (SIMD) has been integrated into various modern processor architectures, e.g., Multimedia Extensions (MMX™), Streaming SIMD Extensions (SSE), and Advanced Vector Extensions (AVX), which are by Intel® of Santa Clara, Calif. The execution circuits that execute these SIMD instructions are vulnerable to software error rate (SER) due to radiation, hard errors due to aging of electromigration, and errors due low voltage operation, among others. Detection of such errors allows proper and safe execution in multiple domains such as in high reliability servers, industrial applications, and functional safety, e.g., autonomous driving. Traditional residue error checking can detect such errors but requires storing a residue code per data element of a SIMD packed vector that undergoes arithmetic processing.

BRIEF DESCRIPTION OF THE DRAWINGS

FIG. 2B illustrates packed data types according to one implementation.

DETAILED DESCRIPTION

Figure 1A:
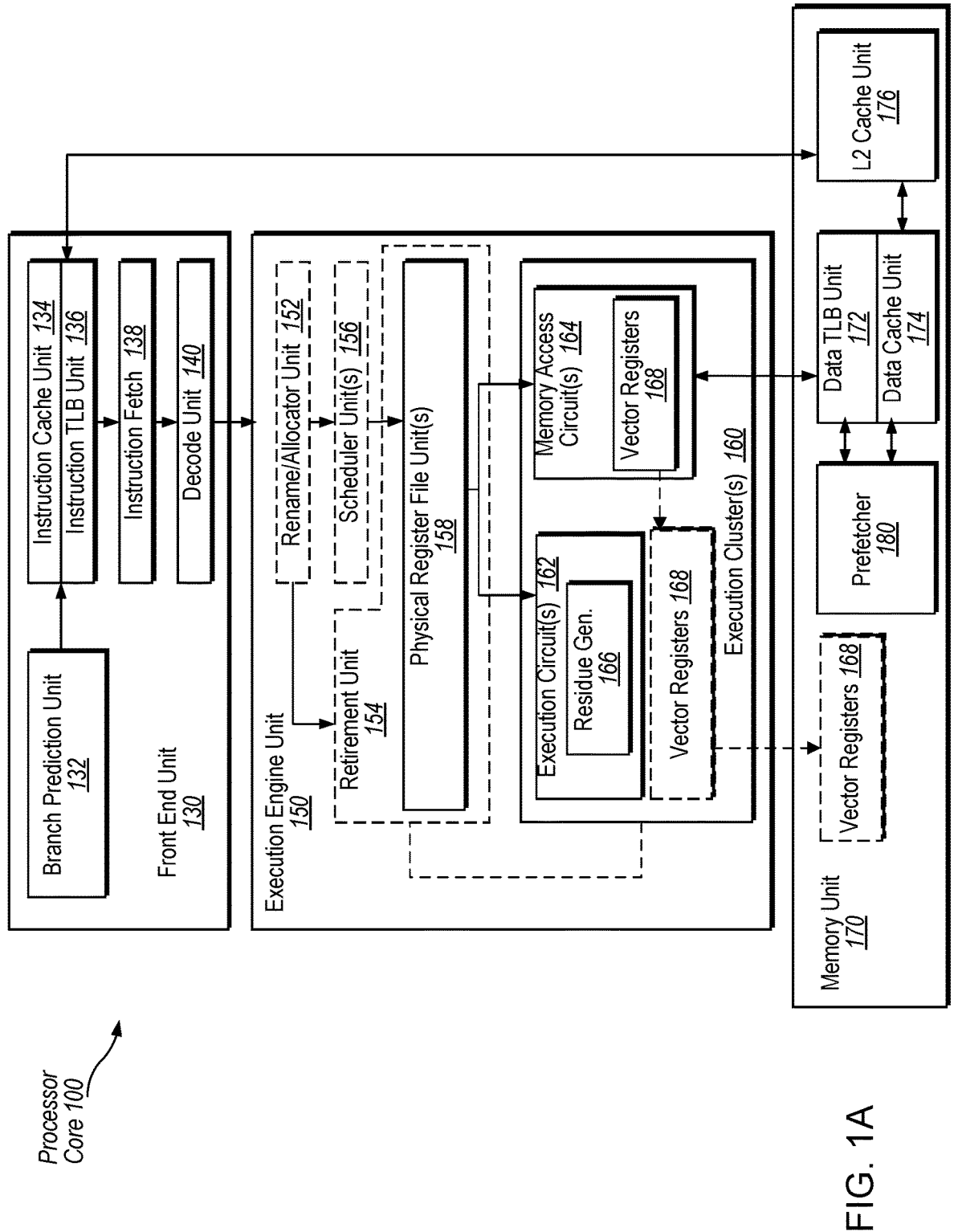
FIG. 1A is a block diagram illustrating a micro-architecture for a processor core or an integrated circuit that executes SIMD instructions within a parallel processor, according to implementations.

In modern central processor unit (CPUs) and other processors, scalar integer execution of addition operations is protected through residue error checking of base three ("3"). Conventionally, vector, or SIMD instruction execution, was not protected due to its high costs. Specifically, the traditional solution for detecting arithmetic error utilizes a residue code for each data element in the SIMD register, e.g., that holds a SIMD packed vector involved in the arithmetic operation. For example, for supporting 8-bit operations of SIMD registers (such as AVX3 (512-bits) registers), 64 residue code are required, thus, for residue code of base three (represented by two bits), the processing of 128 extra bits is utilized for each vector of 64 bytes. Another conventional solution for detecting errors in SIMD execution is full redundancy, which comes with even higher costs than residue codes, executing the operation twice using redundant hardware and comparing the results. The costs of processing 128 additional bits or providing fully redundant computation for error checking are extremely high in terms of chip area and processing power, and thus have not been previously implemented for SIMD arithmetic operations.

In implementations, instead of employing a residue code per data element of a SIMD packed vector, an execution circuit within a processor or core may employ only one residue code for each SIMD packed vector. By way of example, an addition operation of SIMD instructions may employ a single residue code, which may be independent of the size of the SIMD packed vector. Using a single residue code per SIMD packed vector saves on expensive bits that are stored to represent residue code per data element in a conventional additional operation. For example, error-resilient addition for 64-byte (512-bit) vectors that pack 64 single-byte (8-bit) elements (e.g., in Intel's AVX512), an execution circuit can use residue error checking, base three, and thus store two ("2") bits per vector register instead of 128 bits with the traditional residue error checking implementation. This saves on both area and processing power, thus reduces costs of performing error checking via residue codes.

In one implementation, a processor (or processor core) includes a set of vector registers, each of which is to store a packed vector comprising multiple data elements. Each vector may include 2-bits of residue value of the entire vector bits, which should be updated while writing to the vector register. The processor may further include an execution circuit coupled to the set of vector registers. The execution circuit may perform an element-by-element execution of the SIMD arithmetic operation between data elements of the first packed vector and of the second packed vector, resulting in an output packed vector. In parallel, the same arithmetic operation may be performed between the residue codes of the first and the second packed vector, respectively. The execution circuit may further calculate an output residue code of the output packed vector, and detect an error in the SIMD arithmetic operation based on comparison of the reference residue code operation result with the output residue code. The execution circuit may further output a failure signal indicative of the detected error.

FIG. 1A is a block diagram illustrating a micro-architecture for a processor core 100 or an integrated circuit that executes SIMD instructions within a parallel processor according to implementations. Specifically, the processor core 100 depicts an in-order architecture core and a register renaming logic, out-of-order issue/execution logic to be included in a processor according to at least one implementation of the disclosure.

In implementations, the processor core 100 includes a front end unit 130 coupled to an execution engine unit 150, and both are coupled to a memory unit 170. The processor core 100 may be a reduced instruction set computing (RISC) core, a complex instruction set computing (CISC) core, a very long instruction word (VLIW) core, or a hybrid or alternative core type. As yet another option, the processor core 100 may be a special-purpose core, such as, for example, a network or communication core, compression engine, graphics core, or the like. In one implementation, the processor core 100 may be a multicore processor or may be part of a multi-processor system.

In implementations, the front end unit 130 includes a branch prediction unit 132 coupled to an instruction cache unit 134, which is coupled to an instruction translation lookaside buffer (TLB) 136, which is coupled to an instruction fetch unit 138, which is coupled to a decode circuit 140. The decode circuit 140 (also known as a decoder or a decode unit) may decode instructions, and generate as an output one or more micro-operations, micro-code entry points, microinstructions, other instructions, or other control signals, which are decoded from, or which otherwise reflect, or are derived from, the original instructions. The decoder 140 may be implemented using various different mechanisms. Examples of suitable mechanisms include, but are not limited to, look-up tables, hardware implementations, programmable logic arrays (PLAs), microcode read only memories (ROMs), and the like. The instruction cache unit 134 is further coupled to the memory unit 170. The decode unit 140 is coupled to a rename/allocator unit 152 in the execution engine unit 150.

In implementations, the execution engine unit 150 includes the rename/allocator unit 152 coupled to a retirement unit 154 and a set of one or more scheduler unit(s) 156. The scheduler unit(s) 156 represents any number of different scheduler circuits, including reservations stations (RS), central instruction window, etc. The scheduler unit(s) 156 is coupled to the physical register set unit(s) 158. Each of the physical register set units 158 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), and the like. The physical register set unit(s) 158 is overlapped by the retirement unit 154 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 154 and the physical register set unit(s) 158 are coupled to the execution cluster(s) 160.

In implementations, the execution cluster(s) 160 include a set of one or more execution circuits 162, each including a residue generator 166, a set of one or more memory access circuits 164, and a set of vector registers 168. In alternative implementations (illustrated with dashed lines), the vector registers 168 are located elsewhere such as within the memory access circuit(s) 164, elsewhere within the execution cluster(s) 160, or dynamically allocated within the memory unit 170, e.g., a memory device. The execution circuits 162 may perform various SIMD arithmetic operations (e.g., shifts, addition, subtraction, multiplication) and operate on various types of data (e.g., scalar floating point, packed integer, packed floating point, vector integer, vector floating point). The set of vector registers 168 may store, with particular reference to SIMD arithmetic operations, packed vectors of data elements that are input to or output from the execution circuits 162 in execution of the SIMD arithmetic operations. In implementations, the residue generator 166 may determine a residue code (or residual value) of a SIMD arithmetic operation, modulo b (e.g., a selected base), for purposes of error checking which will be discussed in more detail.

While some implementations may include a number of execution circuits 162 dedicated to specific functions or sets of functions, other implementations may include only one execution circuit 162 or multiple execution circuits 162 that all perform all functions. The scheduler unit(s) 156, physical register set unit(s) 158, and execution cluster(s) 160 are shown as being possibly plural because certain implementations create separate pipelines for certain types of data/operations (e.g., a scalar SIMD integer pipeline, a scalar SIMD floating point/packed integer/packed floating point/vector integer/vector floating point pipeline, and/or a memory access pipeline that each have their own scheduler unit, physical register set unit, and/or execution cluster—and in the case of a separate memory access pipeline, certain implementations are implemented in which only the execution cluster of this pipeline has the memory access unit(s) 164). Furthermore, where separate pipelines are used, one or more of these pipelines may be out-of-order issue/execution and the rest in-order.

The set of memory access units 164 is coupled to the memory unit 170, which may include a data prefetcher 180, a data TLB unit 172, a data cache unit (DCU) 174, and a level 2 (L2) cache unit 176, to name a few examples. In some implementations, the DCU 174 is also known as a first level data cache (L1 cache). The DCU 174 may handle multiple outstanding cache misses and continue to service incoming stores and loads. It also supports maintaining cache coherency. The data TLB unit 172 is a cache used to improve virtual address translation speed by mapping virtual and physical address spaces. In one exemplary implementation, the memory access units 164 may include a load unit, a store address unit, and a store data unit, each of which is coupled to the data TLB unit 172 in the memory unit 170. The L2 cache unit 176 may be coupled to one or more other levels of cache and eventually to a main memory.

In one implementation, the data prefetcher 180 speculatively loads/prefetches data to the DCU 174 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor core 100 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figure 1B:
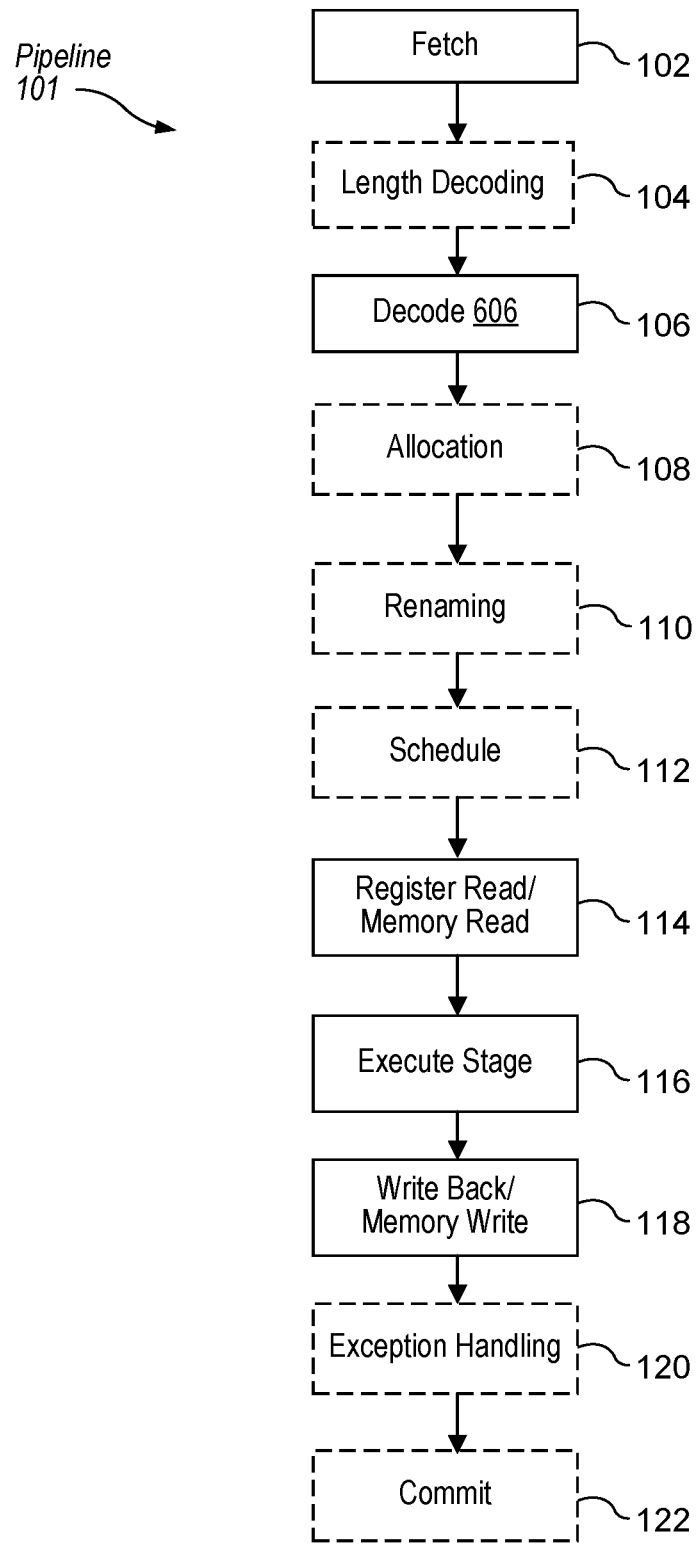
FIG. 1B is a block diagram illustrating an in-order pipeline and a register renaming stage, out-of-order issue/execution pipeline of the processor core of FIG. 1A according to implementations.

FIG. 1B is a block diagram illustrating an in-order pipeline and a register renaming stage, out-of-order issue/execution pipeline implemented by processor core 100 of FIG. 1A according to some implementations of the disclosure. The solid lined boxes in FIG. 1B illustrate an in-order pipeline 101, while the dashed lined boxes illustrate a register renaming, out-of-order issue/execution pipeline 103. In FIG. 1B, the pipelines 101 and 103 include a fetch stage 102, a length decode stage 104, a decode stage 106 to decode a SIMD instruction into a decoded SIMD instruction (or set of micro-operations), an allocation stage 108, a renaming stage 110, a scheduling (also known as a dispatch or issue) stage 112, a register read/memory read stage 114, an execute stage 116, a write back/memory write stage 118, an exception handling stage 120, and a commit stage 122. In some implementations, the ordering of stages 102-124 may be different than illustrated and are not limited to the specific ordering shown in FIG. 1B.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc.

In one implementation, integer registers store thirty-two bit integer data. A register file of one implementation also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX™ technology from Intel® Corporation of Santa Clara, Calif. These MMX™ registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers. Furthermore, the data stored in the integer registers may be of newer SIMD technologies such as AVX2 YMM (256-bit) and/or AVX3 ZMM (512-bit), for example.

Figure 2A:
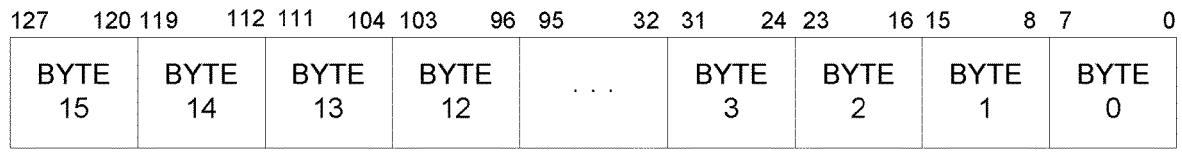
FIG. 2A illustrates packed data types according to one implementation.
Figure 2A:
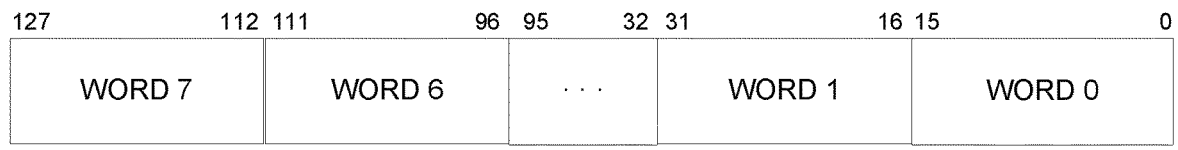
Figure 2A:
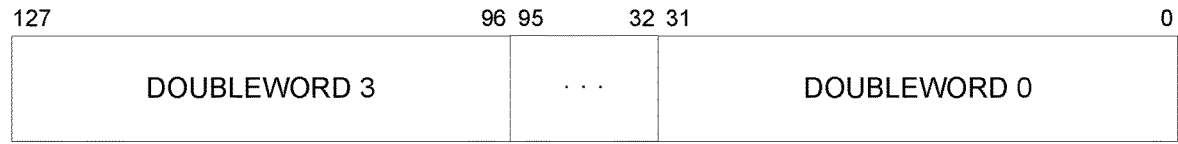
Figure 2A:
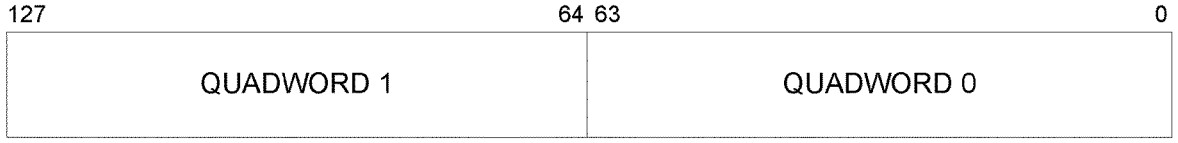

In the examples of the following figures, a number of data operands are described. FIG. 2A illustrates various packed data type representations in vector registers according to one implementation. The packed data type representations may be of packed vectors, each stored in a vector register and composed of the same or different sized data elements. FIG. 2A illustrates data types for a packed byte 210, a packed word 220, a packed doubleword (dword) 230 for 128 bits wide operands, and a packed quadword 240 of 64 bit wide operands. The packed byte format 210 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX™ and SSE technology, the number of data elements stored in an MMX™ register is 64 bits divided by the length in bits of an individual data element. Although the data types illustrated in FIG. 2A are 128 bit long, implementations of the present invention can also operate with 64 bit wide, 256 bit wide, 512 bit wide, or other sized operands. The packed word format 220 of this example is 128 bits long and contains eight packed word data elements. Each packed word contains sixteen bits of information. The packed doubleword format 230 of FIG. 2A is 128 bits long and contains four packed doubleword data elements. Each packed doubleword data element contains thirty two bits of information. A packed quadword is 128 bits long and contains two packed quad-word data elements. Each of these data elements may also be stored using the newer SIMD technologies such as AVX2 YMM (256-bit) and/or AVX3 ZMM (512-bit), for example.

FIG. 2B illustrates various signed and unsigned packed data type representations in vector registers, such as multimedia registers according to one implementation. Unsigned packed byte representation 244 illustrates the storage of an unsigned packed byte in a SIMD register. Information for each byte data element is stored in bit seven through bit zero for byte zero, bit fifteen through bit eight for byte one, bit twenty-three through bit sixteen for byte two, etc., and finally bit one hundred twenty through bit one hundred twenty-seven for byte fifteen. Thus, all available bits are used in the vector register. This storage arrangement can increase the storage efficiency of the processor. As well, with sixteen data elements accessed, one operation can now be performed on sixteen data elements in a parallel fashion. Signed packed byte representation 245 illustrates the storage of a signed packed byte. Unsigned packed word representation 246 illustrates how word seven through word zero are stored in a SIMD register. Signed packed word representation 247 is similar to the unsigned packed word in-register representation 246. Note that the sixteenth bit of each word data element is the sign indicator. Unsigned packed doubleword representation 248 shows how doubleword data elements are stored. Signed packed doubleword representation 249 is similar to unsigned packed doubleword in-register representation 248. Note that the necessary sign bit is the thirty-second bit of each doubleword data element.

Figure 2C:
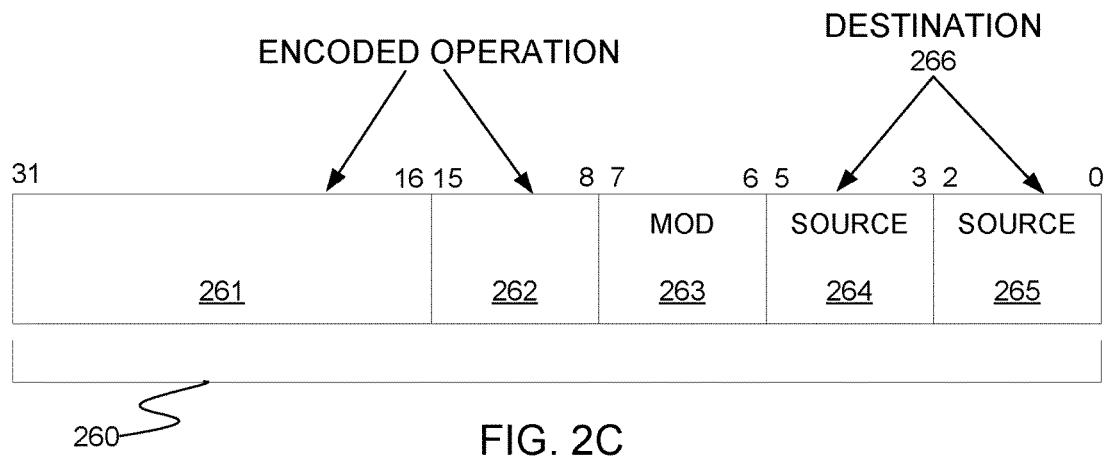
FIG. 2C illustrates an instruction encoding to provide SIMD arithmetic functionality according to one implementation.

FIG. 2C is a depiction of one implementation of an operation encoding (opcode) format 260, having thirty-two or more bits, and register/memory operand addressing modes corresponding with a type of opcode format described in the "Intel® 64 and IA-32 Intel Architecture Software Developer's Manual Combined Volumes 2A and 2B: Instruction Set Reference A-Z," which is which is available from Intel Corporation, Santa Clara, Calif. on the world-wide-web (www) at intel.com/products/processor/manuals/. In one implementation, an instruction is encoded by one or more of fields 261 and 262. Up to two operand locations per instruction may be identified, including up to two source operand identifiers 264 and 265. For one implementation, destination operand identifier 266 is the same as source operand identifier 264, whereas in other implementations they are different. For an alternative implementation, destination operand identifier 266 is the same as source operand identifier 265, whereas in other implementations they are different. In one implementation, one of the source operands identified by source operand identifiers 264 and 265 is overwritten by the results of the instruction, whereas in other implementations identifier 264 corresponds to a source register element and identifier 265 corresponds to a destination register element. For one implementation, operand identifiers 264 and 265 may be used to identify 32-bit or 64-bit source and destination operands.

Figure 2D:
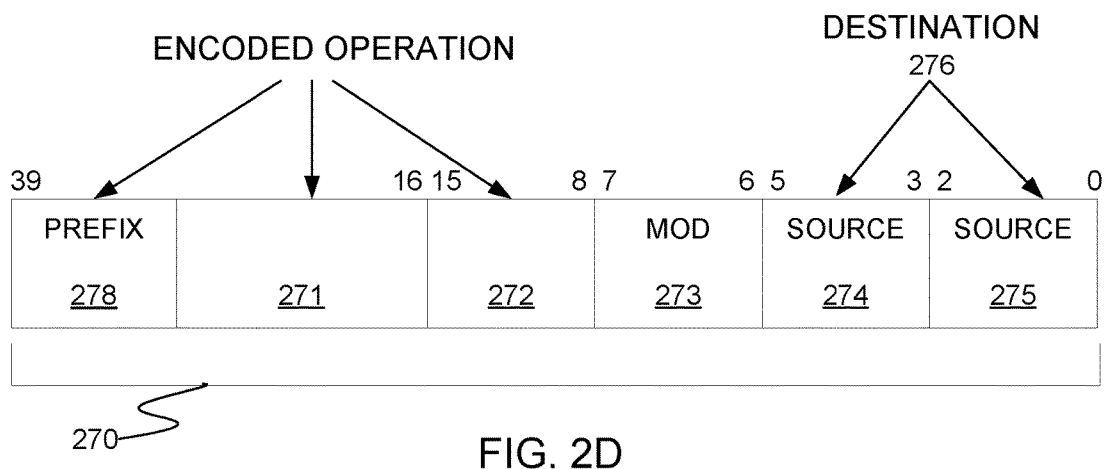
FIG. 2D illustrates an instruction encoding to provide SIMD arithmetic functionality according to another implementation.

FIG. 2D is a depiction of another alternative operation encoding (opcode) format 270, having forty or more bits. Opcode format 270 corresponds with opcode format 260 and comprises an optional prefix byte 278, e.g., a vector extensions (VEX) or an extended EVX (EVEX) prefix to encode SIMD registers. An instruction according to one implementation may be encoded by one or more of fields 278, 271, and 272. Up to two operand locations per instruction may be identified by source operand identifiers 274 and 275 and by prefix byte 278. For one implementation, prefix byte 278 may be used to identify 32-bit or 64-bit source and destination operands. For one implementation, destination operand identifier 276 is the same as source operand identifier 274, whereas in other implementations they are different. For an alternative implementation, destination operand identifier 276 is the same as source operand identifier 275, whereas in other implementations they are different. In one implementation, an instruction operates on one or more of the operands identified by operand identifiers 274 and 275 and one or more operands identified by the operand identifiers 274 and 275 is overwritten by the results of the instruction, whereas in other implementations, operands identified by identifiers 274 and 275 are written to another data element in another register. Opcode formats 260 and 270 allow register to register, memory to register, register by memory, register by register, register by immediate, register to memory addressing specified in part by MOD fields 263 and 273 and by optional scale-index-base and displacement bytes.

Figure 2E:
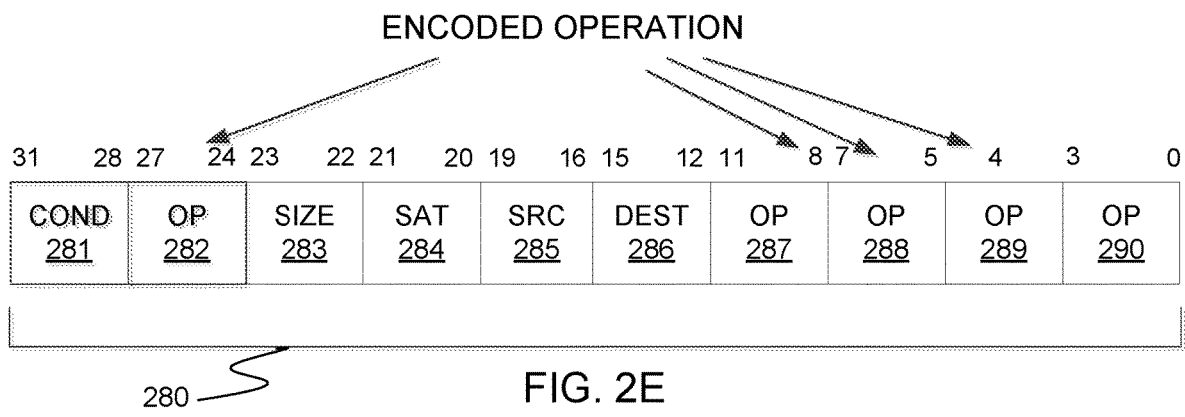
FIG. 2E illustrates an instruction encoding to provide SIMD arithmetic functionality according to another implementation.

Turning next to FIG. 2E, in some alternative implementations, 64-bit (or 128-bit, or 256-bit, or 512-bit or more) SIMD arithmetic operations may be performed through a coprocessor data processing (CDP) instruction. Operation encoding (opcode) format 280 depicts one such CDP instruction having CDP opcode fields 282 and 289. The type of CDP instruction, for alternative implementations, operations may be encoded by one or more of fields 283, 284, 287, and 288. Up to three operand locations per instruction may be identified, including up to two source operand identifiers 285 and 290 and one destination operand identifier 286. One implementation of the coprocessor can operate on 8, 16, 32, and 64 bit values. For one implementation, an instruction is performed on integer data elements. In some implementations, an instruction may be executed conditionally, using condition field 281. For some implementations, source data sizes may be encoded by field 283. In some implementations, Zero (Z), negative (N), carry (C), and overflow (V) detection can be done on SIMD fields. For some instructions, the type of saturation may be encoded by field 284.

In implementations, residue codes are known arithmetic error detecting codes, e.g., a code preserved under a set of arithmetic operations. This property enables the detection of errors that may occur during the execution of an arithmetic operation in a relatively low-overhead manner. This disclosure discusses a design and an implementation of residue error checking for error detection in integer vector execution unit that is SIMD-capable such as the execution circuit 162 discussed with reference to FIG. 1A.

A residue code may be viewed as a modulo operation of some base b (e.g., a selected base) on a number, that generates a residue, e.g., a residual value. In mathematics, the modulo operation finds the reminder after division of one number by another number, which is sometimes referred to as modulus. As an example, given two positive numbers, a (the dividend) and n (the divisor), a modulo n (abbreviated as a mod n) is the remainder of the Euclidean division of a by n. For example, the expression "5 mod 2" would be evaluated as 1 because 5 divided by 2 leaves a quotient of 2 and a remainder of 1, while "9 mod 3" would be evaluated as 0 because the division of 9 by 3 has a quotient of 3 and a remainder of 0, e.g., there is nothing to subtract from 9 after multiplying 3 times 3.

The main property of residue codes is that they are preserved under arithmetic operations. Specifically, for a given two numbers, X Y, and their modulo b, $|X|_b, |Y|_b$, then:

$$|Y+X|_b = ||Y|_b + |X|_b|_b$$

In other words, calculating the residue code for the both of the integer inputs to an addition operation and adding them together is equal to the residue code calculated of the resultant value of the addition operation.

Residues codes whose base, $b=2^r-1$ (or a Mersenne number) for some integer $r \geq 2$ (e.g., b=3, 7, 15) are called low-cost residue codes, since they are relatively easy to be derived. For a given number A represented in binary representation containing n bits, divide the number A into n/r r-bit numbers (assuming that n is divisible by r): $A_0, A_1, \ldots, A_{n/r-1}$, then $$|A|_b = \left| \sum_{i=0}^{(n/r)-1} A_i \right|_b$$

Low cost residues are a property for error detection that guarantees a change on the residue code in the flip of every single bit. In other words, for a given number A and its low-cost residue $|A|_b$ ($b=2^r-1$), assume a single bit modification in the binary representation of A resulting in Ã, thus, $|A|_b \neq |Ã|_b$.

For discussion purposes herein (although not limited to this example of a selected base), assume residue codes of base b=3, which is encoded into 2-bits unless otherwise stated. When b is set to three, the execution circuit 162 in FIG. 1 may perform residue code error checking least expensively and still enable detection of single errors. This residue code is able to detect any single bit error and provides ⅔ or 66% detection coverage on a random multiple bit flips scenario. Following the above expression, the residue of the decimal number 46238 (base 10) represented in binary format following binary representation 1011010010011110b (base 2) is given as follows:

$$|1011010010011110b|_3 = ||10b|_3 + |11|_3 + |01b|_3 + |00b|_3 + |10b|_3 + |11b|_3 + |11b|_3 + |10b|_3|_3 = |10b|_3$$

Conventionally, these 2-bit residue codes (or values) travel along with the data and are used to check a residue calculation on the result of an operation, and thereby signal a fault in an event of a mismatch in the expected and calculated values differ.

Figures 3A, 3B, 3C:
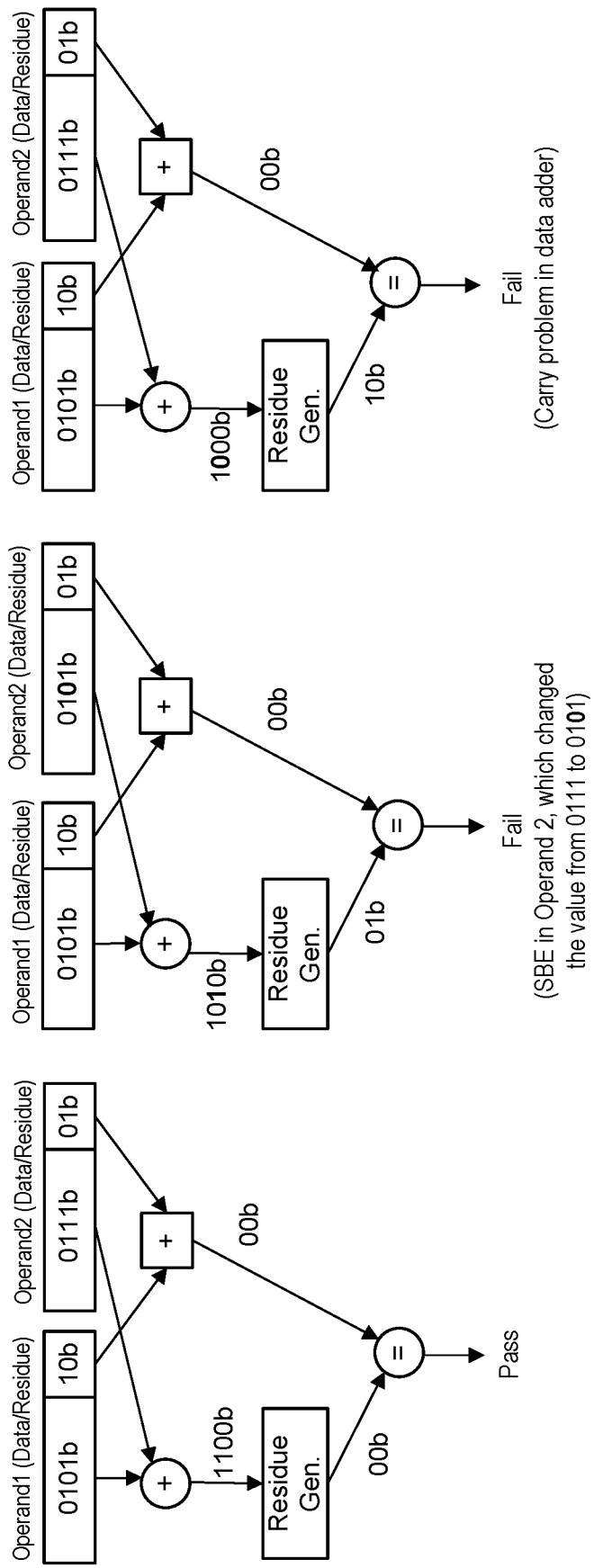
FIGS. 3A, 3B, and 3C are block diagrams that illustrate use of residue codes in several SIMD addition operations according to various implementations.

FIGS. 3A, 3B, and 3C are block diagrams that illustrate use of residue codes in several SIMD addition operations according to various implementations. The residue codes (or values) of one ("1") in FIG. 3A for each operand input into the additional operation, when added, equals two. The residue generator, such as residue generator 166 of FIG. 1A, also generates a residue code of zero, which therefore matches, resulting in a pass of the error check. The residue codes are similarly calculated in FIG. 3B, but the error check results in a fail because of the simple binary encoding (SBE) in operand two was incorrect (is 0101b instead of a 0111b as is shown in FIG. 3A). Because of this error, the residue generator generates a residue code of one, which does not match zero of the reference residue code. The residue codes are similarly calculated in FIG. 3C, but also result in a mismatch (a two instead of a zero), and thus a failure in the error checking due to a carry problem in the data error of the execution circuit 162.

Figure 4:
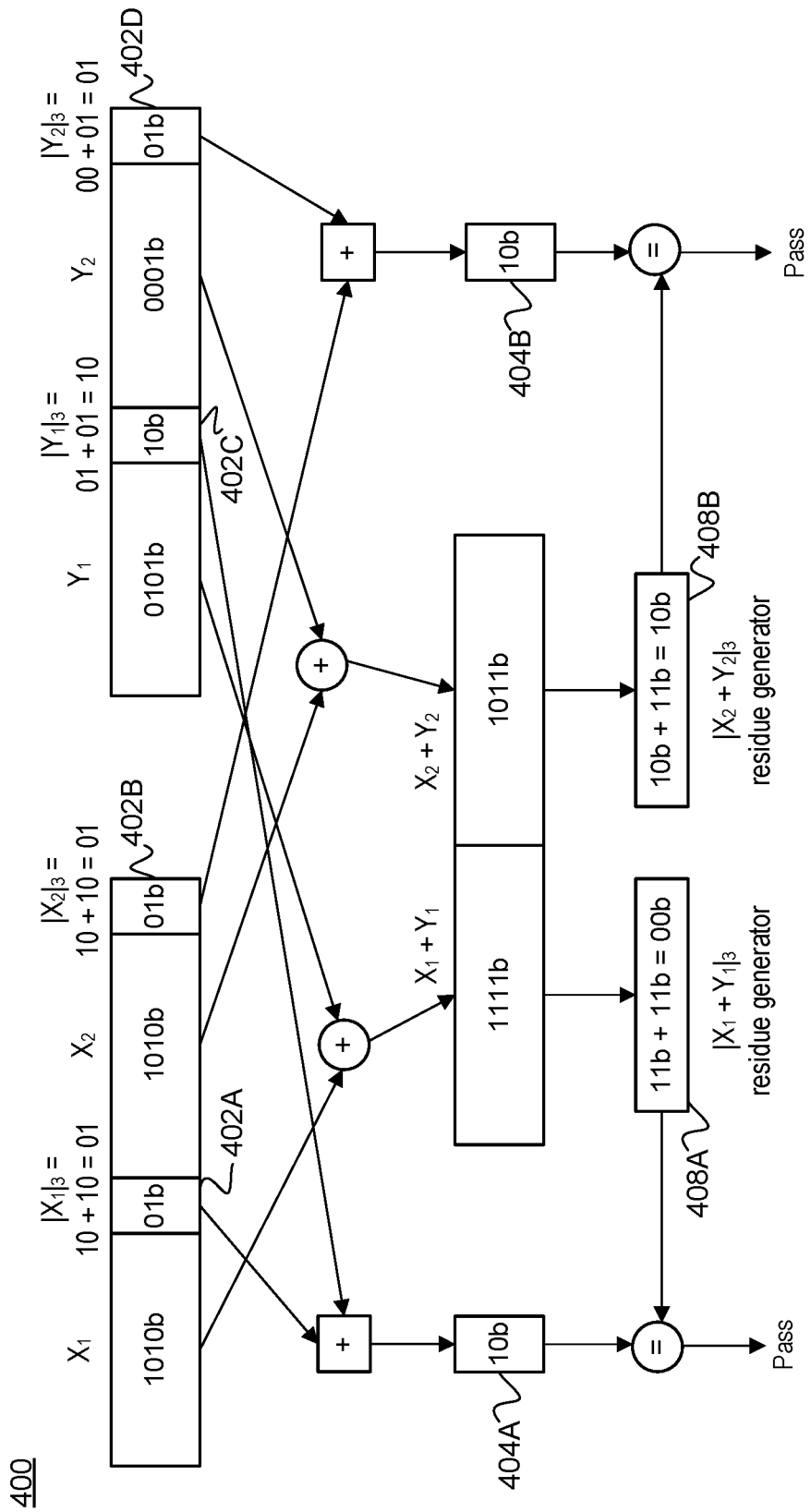
FIG. 4 is a block diagram that illustrates conventional residue error checking to perform error detection for a SIMD addition operation according to implementations.

FIG. 4 is a block diagram 400 that illustrates conventional residue error checking to perform error detection for a SIMD addition operation according to implementations. In conventional residue error checking, each data element X1, X2, Y1, and Y2 carries with it within vector registers corresponding residue codes 402A, 402B, 402C, and 402D, which are calculated modulo three, as illustrated. The addition of the first residue codes 402A and 402C of respective first data elements (X1, Y1) of the input packed vectors results in a first reference residue code 404A. The addition of the second residue codes 402B and 402D of respective second data elements (X2, Y2) of the input packed vectors results in a second reference residue code 404B.

In implementations, the residue generator may then calculate a third residue code 408A of the result of the addition of the first data elements (X1, Y1) and a fourth residue code 408B of the result of the addition of the second data elements (X2, Y2). The execution circuit 162 may then compare the first reference residue code 404A with the third residue code 408B to determine that the residue error check passes for the first data elements (X1, Y1). The execution circuit 162 may also compare the second reference residue code 404B with the fourth residue code 408B to determine that the residue error check passes for the second data elements (X2, Y2). In this way, the execution circuit 162 performs a lot of additional addition operations in calculating the residue codes that are passed along until the reference residue codes can be compared to resultant residue codes that are generated from the results of the addition operation. This is a simple example, but the additional bits and processing steps would be magnified with additional data elements as are typically present in a SIMD packed vector (illustrated in FIGS. 2A-2C).

As discussed, in disclosed implementations, the execution circuit 162 may instead implement a single two-bit residue mechanism for the entire SIMD packed vector, which motivates the use of a single residue mechanism, independent of the size(s) of the data elements, for an addition operation of multiple data elements. The employment of a single residue code for the entire SIMD packed vector is based on the observation that the addition of the SIMD vector packed elements may be considered as the addition of a large number composed of the concatenated element bits in case there is no overflow between the elements.

A formal theorem is now disclosed that motivates the usage of the proposed single two-bit residue code mechanism. The formal theorem is given in a generic formulation, e.g., for a residue base of form $b=2^r-1$, a SIMD vector of size n-bits packing elements of size l-bits, and provides conditions for the correctness of the approach.

Theorem 1: Given two packed arguments X(n), Y(n) of n bits packing n/l elements of l bits $$x_0(l) \ldots x_{\frac{n}{l}-1}(l), y_0(l), \ldots, y_{\frac{n}{l}-1}(l).$$

Moreover, given is a residue code in form of $b=2^r-1$ (Mersenne number) for some integer r≥2, such that l mod r=0. Then, in case $\forall i \; x_i(l)+y_i(l)$ max l (maximum integer number represented by l bits), $$\||X(n)|_b + |Y(n)|_b\| = \left| \sum_{i=0}^{(\frac{n}{l})-1} |x_i(l) + y_i(l)|_b \right|_b$$

Proof:

$$\||X(n)|_b + |Y(n)|_b\| = \left| \left( \sum_{i=0}^{(n/l)-1} |x_i(l)|_b \right) + \left( \sum_{i=0}^{(n/l)-1} |y_i(l)|_b \right) \right|_b =$$

$$\left| \sum_{i=0}^{(\frac{n}{l})-1} (|x_i(l)|_b + |y_i(l)|_b) \right|_b = \left| \sum_{i=0}^{(n/l)-1} |x_i(l) + y_i(l)|_b \right|_b$$

Note that the above equality is satisfied due to the commutative property of addition operations. The above Theorem motivates the usage of a single residue of base three for all packed data elements within a packed vector for an addition operation, as the size of the existing packed data elements in ISA are even, and thus, they are divisible by residue code of base three, e.g., size r=2. Note that the residue property is not preserved in case of overflow, e.g., ∃i $\forall i \; x_i(l)+y_i(l)$>max l, and an appropriated correcting scheme is discussed with reference to FIGS. 7-8.

Figure 5:
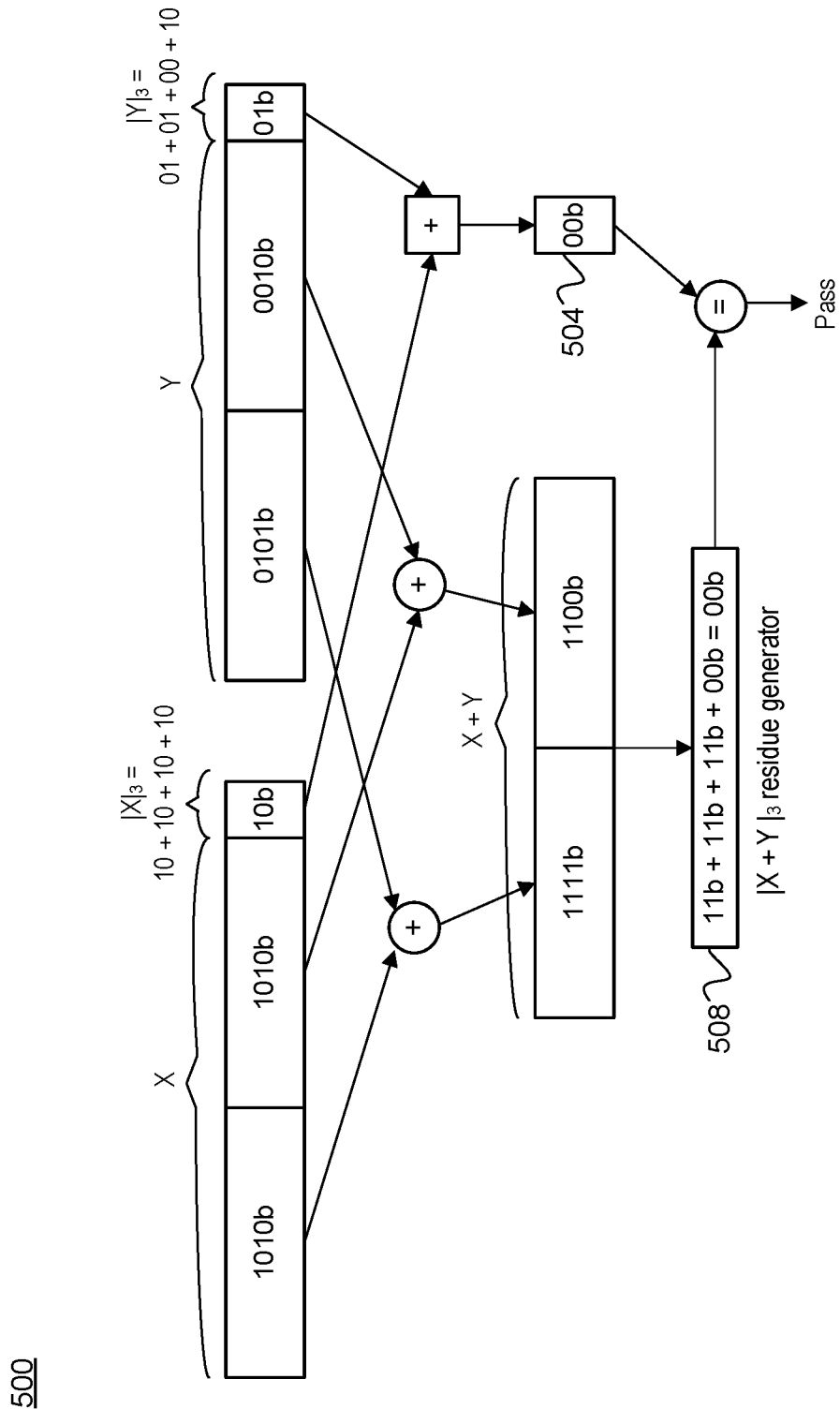
FIG. 5 is a block diagram that illustrates the disclosed residue error checking to perform error detection for a SIMD addition operation in the case of no error according to an implementation.

FIG. 5 is a block diagram 500 that illustrates the disclosed residue error checking to perform error detection for a SIMD addition operation in the case of no error according to an implementation. For example, FIG. 5 illustrates the employment of the proposed residue (base 3) mechanism for arithmetic error detection for a packed vector of eight bits packing two elements of four bits each including a numerical example. In one implementation, the execution circuit 162 receives the two packed vectors X and Y with their appropriate 2-bit residue codes $|X|_3$ and $|Y|_3$, and proceed with a SIMD addition operation. In one implementation, the execution circuit 162 is the component to initially calculate the 2-bit residue codes.

With further reference to FIG. 5, the execution circuit 162 may subsequently perform the elementwise SIMD addition operation of the packed vectors (X and Y) and the residue codes $|X|_3$ and $|Y|_3$ to generate, respectively, an output packed vector (X+Y) and an reference residue code 504 for the SIMD addition operation. Next, the residue generator 166 of the execution circuit 162 may calculate an output residue code 508 of the output packed vector. Then, execution circuit 162 may compare the output reside code 508 with the reference residue code 504 to determine whether there is an error. If the two match, the execution circuit 162 detects no error and may output an indication that the error checking passed. Otherwise, if the two do not match, the execution circuit 162 detects an error and may further output a failure signal indicative of the detected error.

Figure 6:
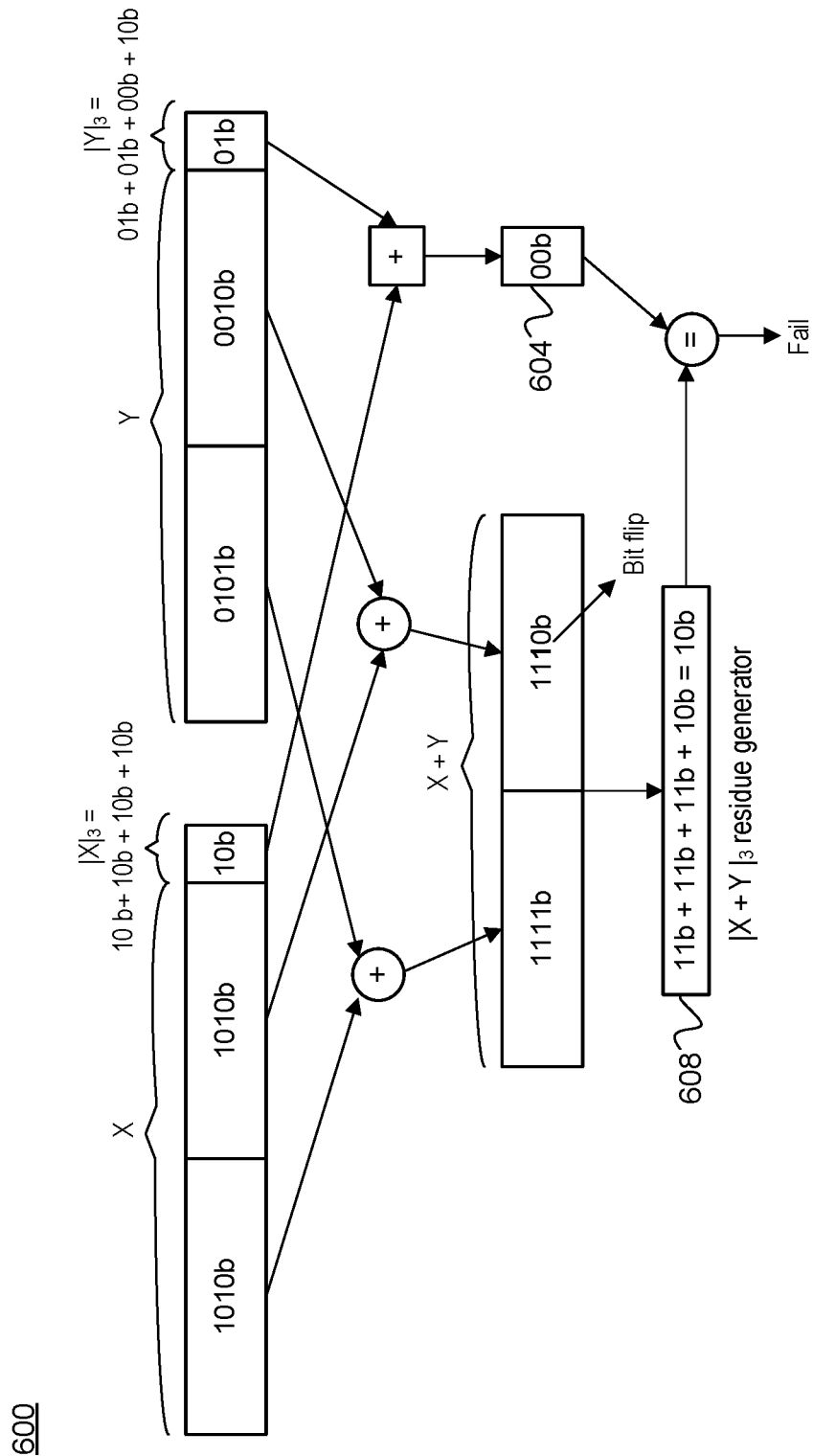
FIG. 6 is a block diagram that illustrates the disclosed residue error checking to perform error detection for a SIMD addition operation in the case of an error according to an implementation.

FIG. 6 is a block diagram 600 that illustrates the disclosed residue error checking to perform error detection for a SIMD addition operation in the case of an error according to an implementation. In the implementation of FIG. 6, in performing the addition of the second data elements of each of the input packed vectors (X and Y), a bit has been flipped, generating a value of 1110b instead of 1100b (compare with FIG. 5). Accordingly, while a reference residue code 604 is the same as the reference residue code 504 of FIG. 5, an output residue code 608 is not the same as the output residue code 508 of FIG. 5, resulting in generation of a failure signal indicative of the detected error.

In implementations, computer arithmetic is based on an operation in fixed size operands, therefore, there is a requirement to correct the calculated residue code in case of an overflow in the arithmetic operation, either in addition and multiplication operations, as follows.

$$|Y+X|_3 = \begin{cases} ||Y|_3 + |X|_3|_3 & \text{if no overflow} \\ ||Y|_3 + |X|_3|_3 + 2 & \text{if overflow} \end{cases}$$

Figure 7:
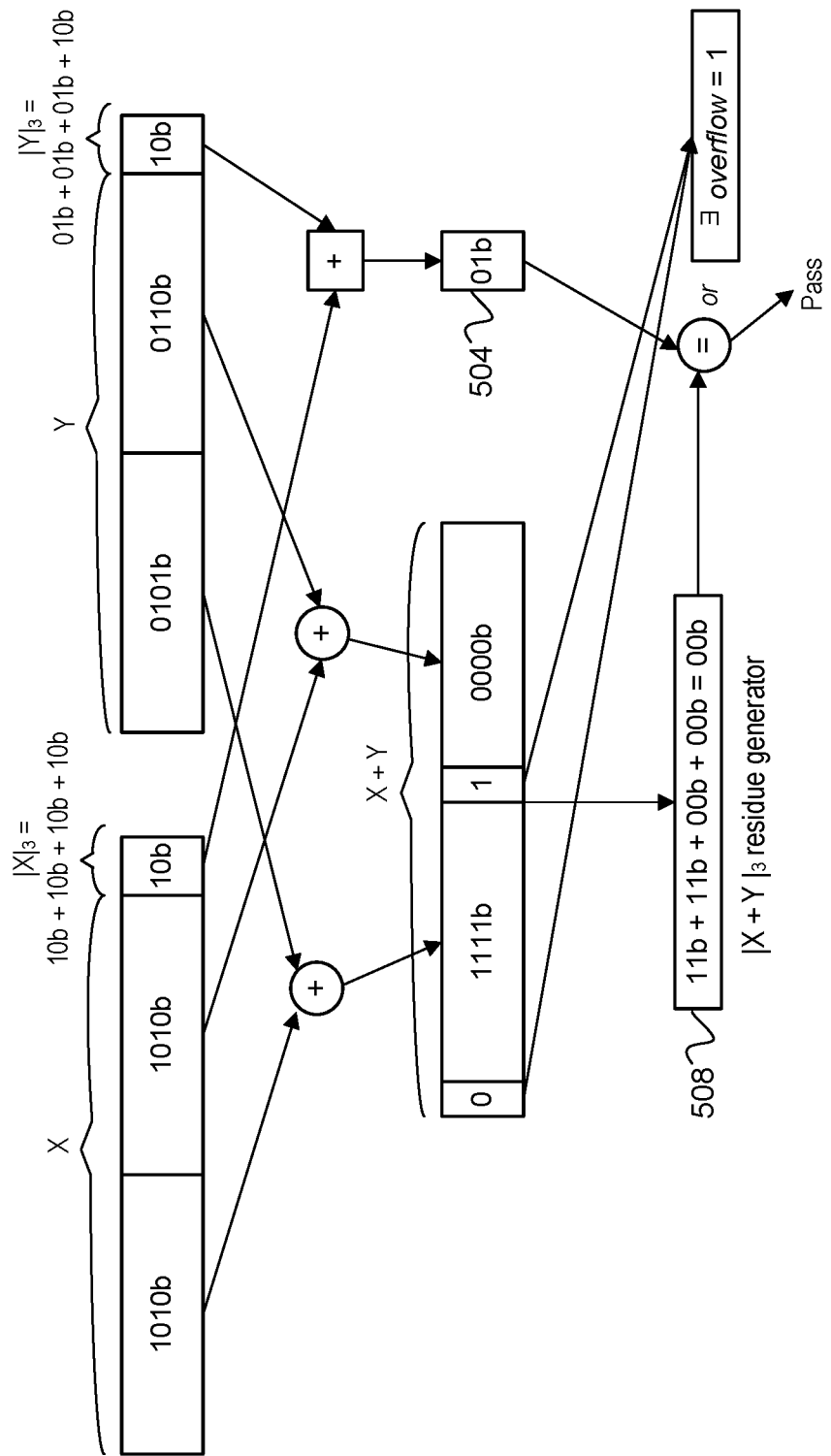
FIG. 7 is a block diagram that illustrates disclosed residue error checking to perform error detection for a SIMD addition operation in an overflow condition case according to an implementation.

FIG. 7 is a block diagram 700 that illustrates disclosed residue error checking to perform error detection for a SIMD addition operation in an overflow condition case according to an implementation. The case of an overflow condition is expected to be rare as the software developer manual defines that the user is responsible for handling overflow. Accordingly, in one implementation, the execution circuit 162 may disregard error checking in the case of detecting overflow, e.g., output an indication that error checking passed, which is illustrated in FIG. 7.

Figure 8:
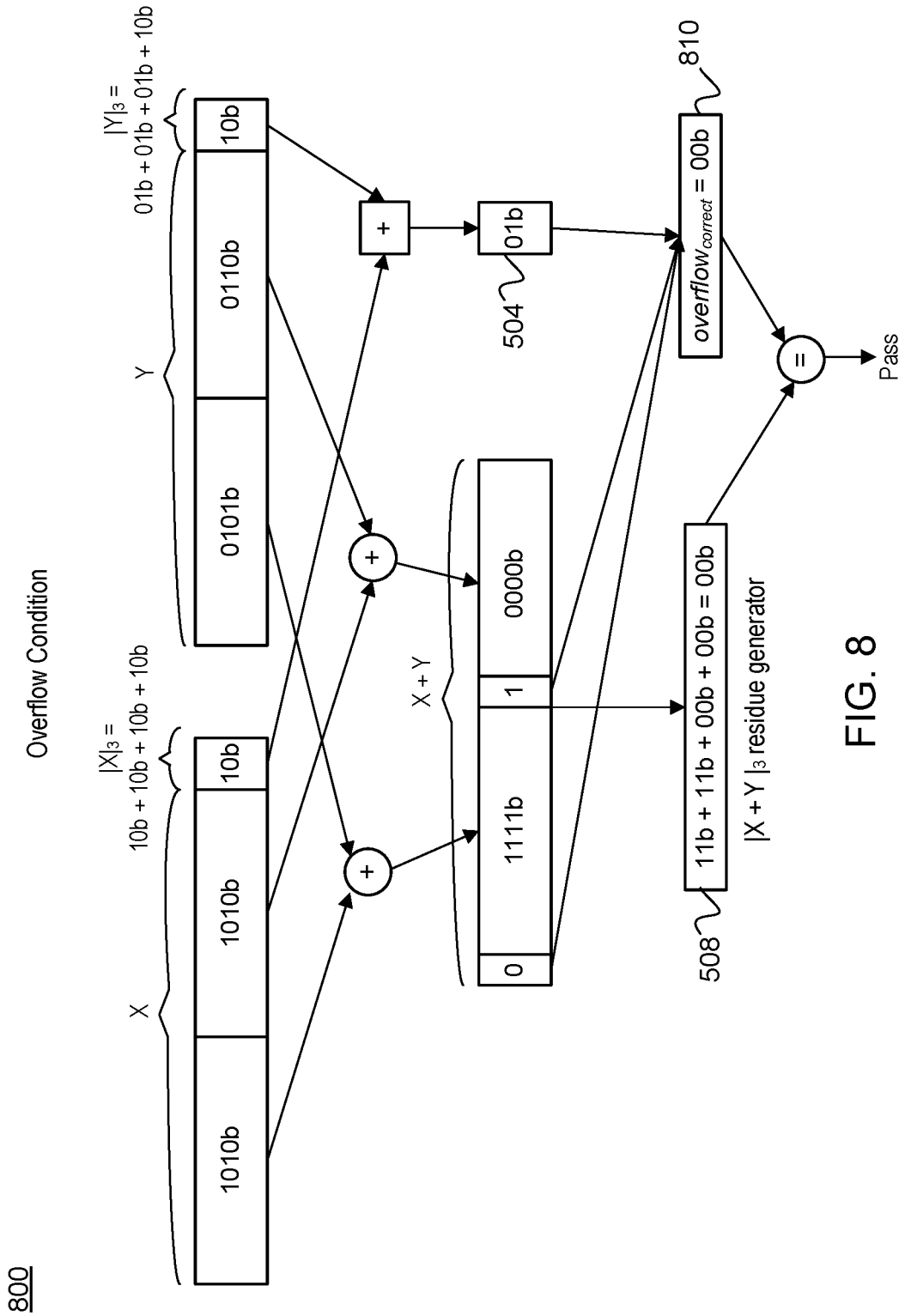
FIG. 8 is a block diagram that illustrates disclosed residue error checking to perform error detection for a SIMD addition operation in an overflow condition case according to another implementation.

FIG. 8 is a block diagram 800 that illustrates disclosed residue error checking to perform error detection for a SIMD addition operation in an overflow condition case according to another implementation. In an alternative embodiment, the execution circuit 162 is further to, in response to detection of an overflow condition in the SIMD arithmetic operation, one of subtract one or add two to the reference residue code 504 to correct the reference residue code 504, which is illustrated in FIG. 8 at block 810. In this scenario, the execution circuit 162 may further output an indication that the error checking passed.

Figure 9:
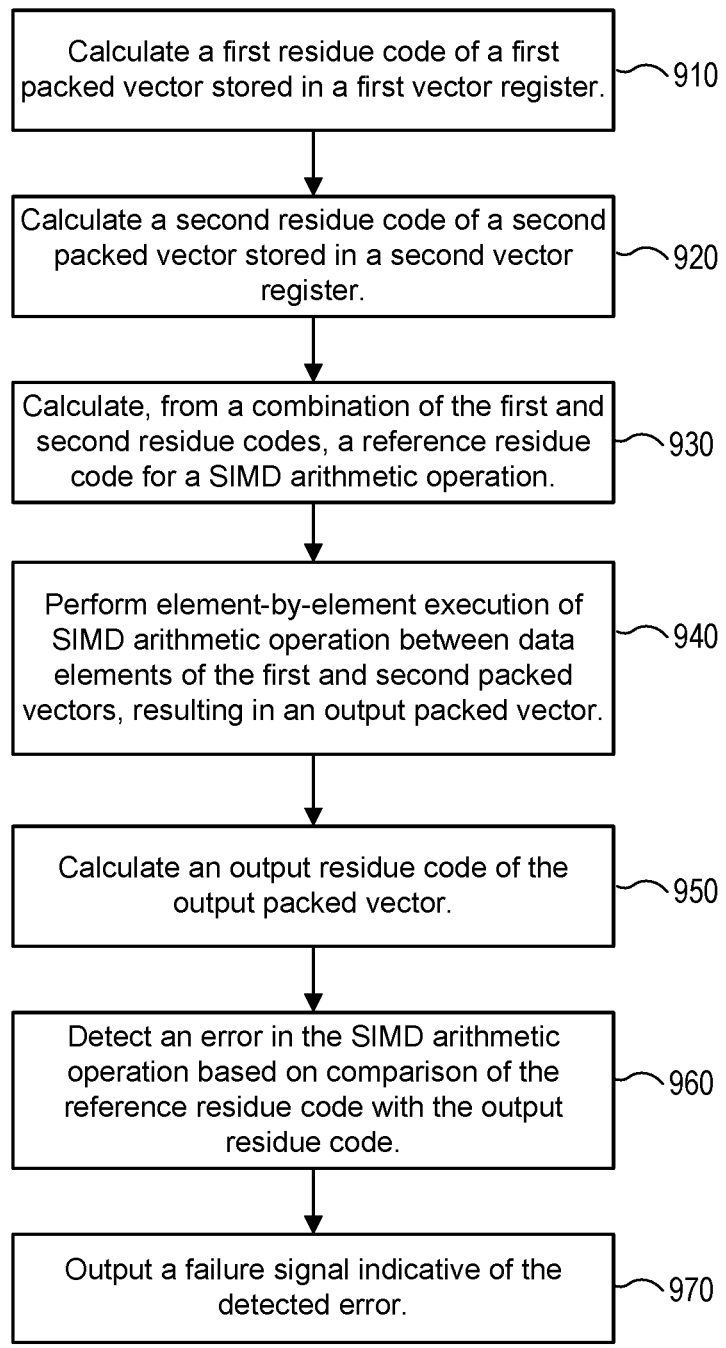
FIG. 9 is a flow chart of a method for employing a single residue code per SIMD packed vector in performing residue error checking, according to various implementations.

FIG. 9 is a flow chart of a method 900 for employing a single residue code per SIMD packed vector in performing residue error checking, according to various implementations. The method 900 may be performed by processing logic that may include hardware (e.g., circuitry, dedicated logic, and/or programmable logic), software (e.g., instructions executable on a computer system to perform hardware simulation), or a combination thereof. In an illustrative example, the method 900 may be performed by the processor core 100 and pipeline 101 of the system of FIGS. 1A-1B, including at least partly by the execution circuit 162. In implementations, the steps of the method need not be performed serially but in parallel as illustrated in FIG. 3A through FIG. 8.

With reference to FIG. 9, the method 900 may begin with the processing logic calculating a first residue code of a first packed vector stored in a first vector register of a set of vector registers (910). The method 900 may continue with the processing logic calculating a second residue code of a second packed vector stored in a second vector register of the set of vector registers (920). The method 900 may continue with the processing logic calculating, from the addition of the first residue code and the second residue code, a reference residue code for a SIMD arithmetic operation (930). The method 900 may continue with the processing logic performing an element-by-element execution of the SIMD arithmetic operation (e.g., SIMD addition) between data elements of the first packed vector and of the second packed vector, resulting in an output packed vector (940). The method 900 may continue with the processing logic calculating an output residue code of the output packed vector (950). The method 900 may continue with the processing logic detecting an error in the SIMD arithmetic operation based on comparison of the reference residue code with the output residue code (960).

With additional reference to FIG. 9, the method 900 may continue with the processing logic outputting a failure signal indicative of the detected error (970). In some implementations, the first residue code, the second residue code, the reference residue code, and the output residue code are calculated as the SIMD arithmetic operation, modulo three.

In implementations, Table 1 summarizes the vector and element sizes implemented in X86 architecture and the number of residue codes required to support error detection in addition operations of typical element packing sizes.

TABLE 1

| Vector size | Element Size | Conventional extra bits required for residue checking | Disclosed bits for residue checking |
|---|---|---|---|
| 512-bit | 8-bit | 128-bits | 2-bits |
|  | 16-bit | 64-bits |  |
|  | 32-bit | 32-bits |  |
|  | 64-bit | 16-bits |  |
| 256-bit | 8-bit | 64-bits | 2-bits |
|  | 16-bit | 32-bits |  |
|  | 32-bit | 16-bits |  |
|  | 64-bit | 8-bits |  |
| 128-bit | 8-bit | 32-bits | 2-bits |
|  | 16-bit | 16-bits |  |
|  | 32-bit | 8-bits |  |
|  | 64-bit | 4-bits |  |

From Table 1, one may conclude that the disclosed use of a single two-bit residue code provides an error code detection method independent of the number of elements packed by the SIMD vector. The conventional approach requires a residue code for each data element, resulting in the maintenance of 128-bits (64 base three residue codes) for a SIMD vector of 512-bit packing 8-bit elements. In contrast, the disclosed approach explained with reference to FIGS. 5-9 calls for only a single base three residue code of 2 bits, which results in about a sixty-fourth cost reduction.

Figure 10:
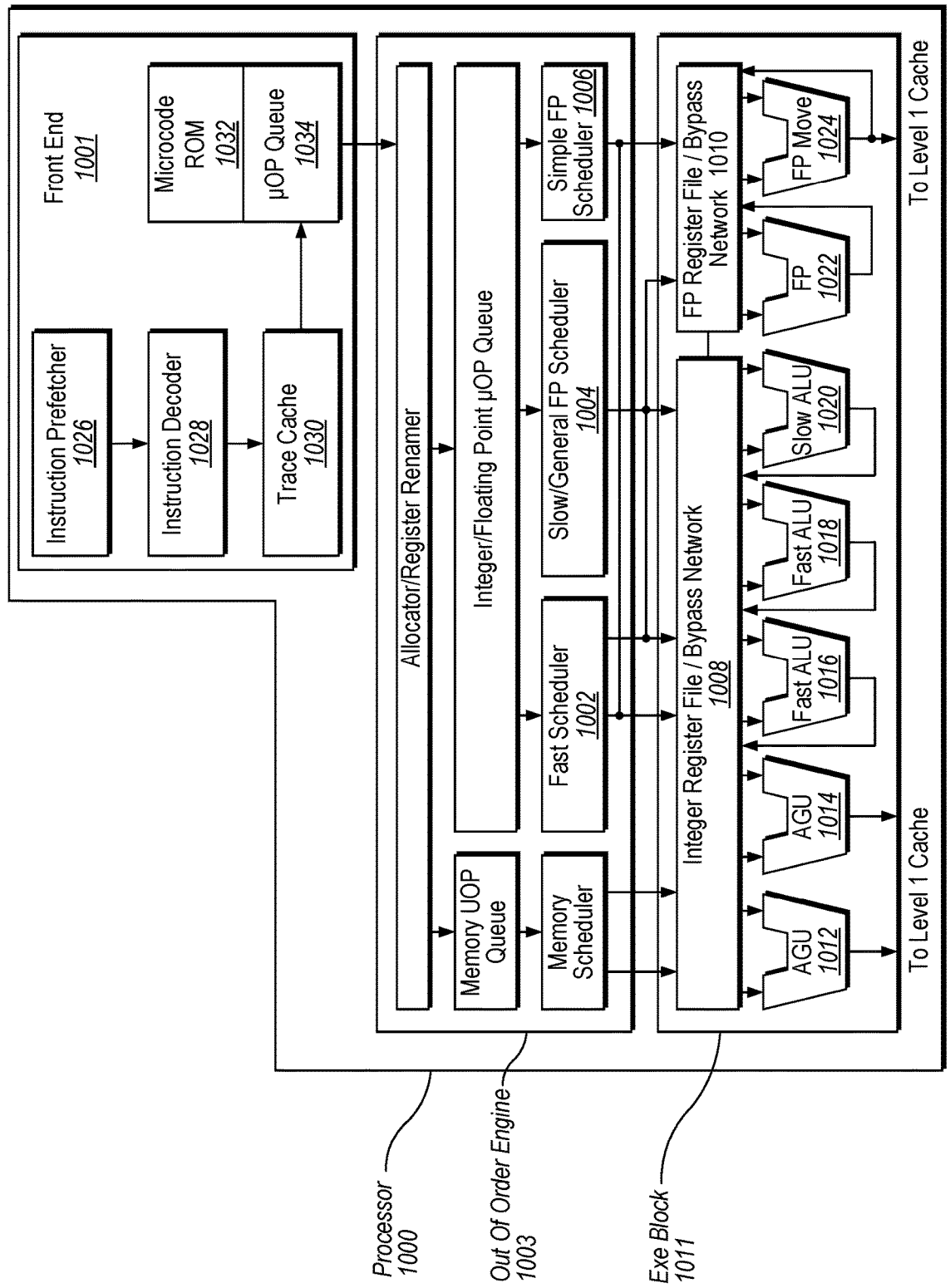
FIG. 10 illustrates a block diagram of the micro-architecture for a processor or an integrated circuit that implements residue error checking according to an implementation of the disclosure.

FIG. 10 illustrates a block diagram of the micro-architecture for a processor 1000 that includes logic circuits of a processor or an integrated circuit that implements residue error checking, according to an implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 1001 is the part of the processor 1000 that fetches instructions to be executed and prepares them to be used later in the processor pipeline. The implementations of the page additions and content copying can be implemented in processor 1000.

The front end 1001 may include several units. In one implementation, the instruction prefetcher 1026 fetches instructions from memory and feeds them to an instruction decoder 1028 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 1030 takes decoded uops and assembles them into program ordered sequences or traces in the uop queue 1034 for execution. When the trace cache 1030 encounters a complex instruction, microcode ROM (or RAM) 1032 provides the uops needed to complete the operation.

Some instructions are converted into a single micro-op, whereas others need several micro-ops to complete the full operation. In one implementation, if more than four micro-ops are needed to complete an instruction, the instruction decoder 1028 accesses the microcode ROM 1032 to do the instruction. For one implementation, an instruction can be decoded into a small number of micro ops for processing at the instruction decoder 1028. In another implementation, an instruction can be stored within the microcode ROM 1032 should a number of micro-ops be needed to accomplish the operation. The trace cache 1030 refers to an entry point programmable logic array (PLA) to determine a correct micro-instruction pointer for reading the micro-code sequences to complete one or more instructions in accordance with one implementation from the micro-code ROM 1032. After the microcode ROM 1032 finishes sequencing micro-ops for an instruction, the front end 1001 of the machine resumes fetching micro-ops from the trace cache 1030.

The out-of-order execution engine 1003 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 1002, slow/general floating point scheduler 1004, and simple floating point scheduler 1006. The uop schedulers 1002, 1004, 1006, determine when a uop is ready to execute based on the readiness of their dependent input register operand sources and the availability of the execution resources the uops need to complete their operation. The fast scheduler 1002 of one implementation can schedule on each half of the main clock cycle while the other schedulers can only schedule once per main processor clock cycle. The schedulers arbitrate for the dispatch ports to schedule uops for execution.

Register sets 1008, 1010, sit between the schedulers 1002, 1004, 1006, and the execution units 1012, 1014, 1016, 1018, 1020, 1022, 1024 in the execution block 1011. There is a separate register set 1008, 1010, for integer and floating point operations, respectively. Each register set 1008, 1010, of one implementation also includes a bypass network that can bypass or forward just completed results that have not yet been written into the register set to new dependent uops. The integer register set 1008 and the floating point register set 1010 are also capable of communicating data with the other. For one implementation, the integer register set 1008 is split into two separate register sets, one register set for the low order 32 bits of data and a second register set for the high order 32 bits of data. The floating point register set 1010 of one implementation has 128 bit wide entries because floating point instructions typically have operands from 64 to 128 bits in width.

The execution block 1011 contains the execution units 1012, 1014, 1016, 1018, 1020, 1022, 1024, where the instructions are actually executed. This section includes the register sets 1008, 1010, that store the integer and floating point data operand values that the micro-instructions need to execute. The processor 1000 of one implementation is comprised of a number of execution units: address generation unit (AGU) 1012, AGU 1014, fast ALU 1016, fast ALU 1018, slow ALU 1020, floating point ALU 1012, floating point move unit 1014. For one implementation, the floating point execution blocks 1012, 1014, execute floating point, MMX, SIMD, and SSE, or other operations. The floating point ALU 1012 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 1016, 1018. The fast ALUs 1016, 1018, of one implementation can execute fast operations with an effective latency of half a clock cycle. For one implementation, most complex integer operations go to the slow ALU 1020 as the slow ALU 1020 includes integer execution hardware for long latency type of operations, such as a multiplier, shifts, flag logic, and branch processing. Memory load/store operations are executed by the AGUs 1022, 1024. For one implementation, the integer ALUs 1016, 1018, 1020, are described in the context of performing integer operations on 64 bit data operands. In alternative implementations, the ALUs 1016, 1018, 1020, can be implemented to support a variety of data bits including 16, 32, 128, 256, etc. Similarly, the floating point units 1022, 1024, can be implemented to support a range of operands having bits of various widths. For one implementation, the floating point units 1022, 1024, can operate on 128 bits wide packed data operands in conjunction with SIMD and multimedia instructions.

In one implementation, the uops schedulers 1002, 1004, 1006, dispatch dependent operations before the parent load has finished executing. As uops are speculatively scheduled and executed in processor 1000, the processor 1000 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store 32-bit integer data. A register set of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register set or different register sets. Furthermore, in one implementation, floating point and integer data may be stored in different registers or the same registers.

Figure 11:
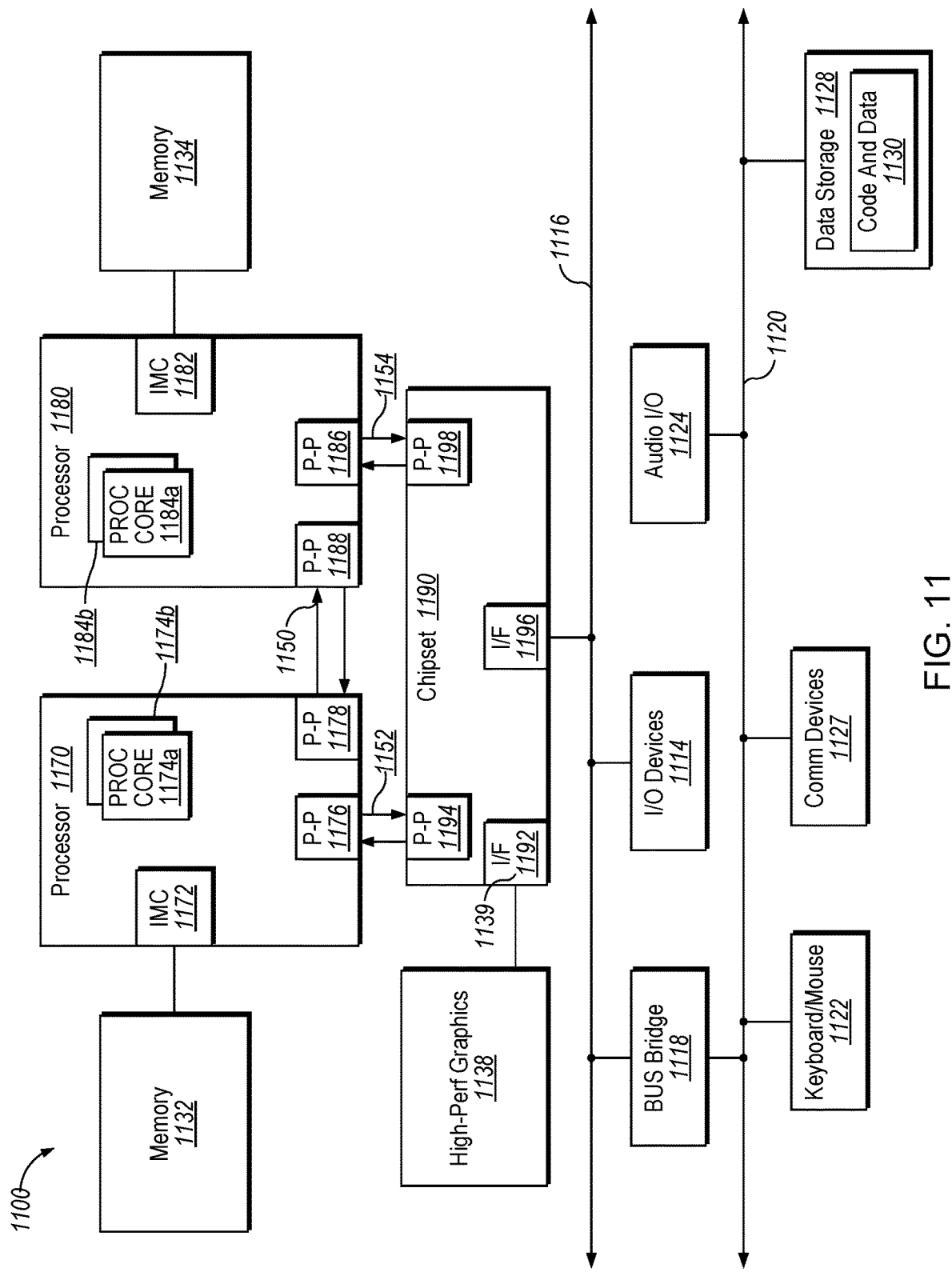
FIG. 11 is a block diagram of a computer system according to one implementation.

Implementations may be implemented in many different system types. Referring now to FIG. 11, shown is a block diagram of a multiprocessor system 1100 that may implement hardware support for residue error checking, in accordance with an implementation. As shown in FIG. 11, multiprocessor system 1100 is a point-to-point interconnect system, and includes a first processor 1170 and a second processor 1180 coupled via a point-to-point interconnect 1150. As shown in FIG. 11, each of processors 1170 and 1180 may be multicore processors, including first and second processor cores (i.e., processor cores 1174*a* and 1174*b* and processor cores 1184*a* and 1184*b*), although potentially many more cores may be present in the processors. While shown with two processors 1170, 1180, it is to be understood that the scope of the disclosure is not so limited. In other implementations, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may exchange information with a chipset 1190 via individual P-P interfaces 1152, 1154 using point to point interface circuits 1176, 1194, 1186, 1198. Chipset 1190 may also exchange information with a high-performance graphics circuit 1138 via a high-performance graphics interface 1192.

Chipset 1190 may be coupled to a first bus 1116 via an interface 1196. In one implementation, first bus 1116 may be a Peripheral Component Interconnect (PCI) bus, or a bus such as a PCI Express bus or interconnect bus, although the scope of the disclosure is not so limited.

As shown in FIG. 11, various I/O devices 1114 may be coupled to first bus 1116, along with a bus bridge 1118 which couples first bus 1116 to a second bus 1120. In one implementation, second bus 1120 may be a low pin count (LPC) bus. Various devices may be coupled to second bus 1120 including, for example, a keyboard and/or mouse 1122, communication devices 1127 and a storage unit 1128 such as a disk drive or other mass storage device which may include instructions/code and data 1130, in one implementation. Further, an audio I/O 1124 may be coupled to second bus 1120. Note that other architectures are possible. For example, instead of the point-to-point architecture of FIG. 11, a system may implement a multi-drop bus or other such architecture.

Figure 12:
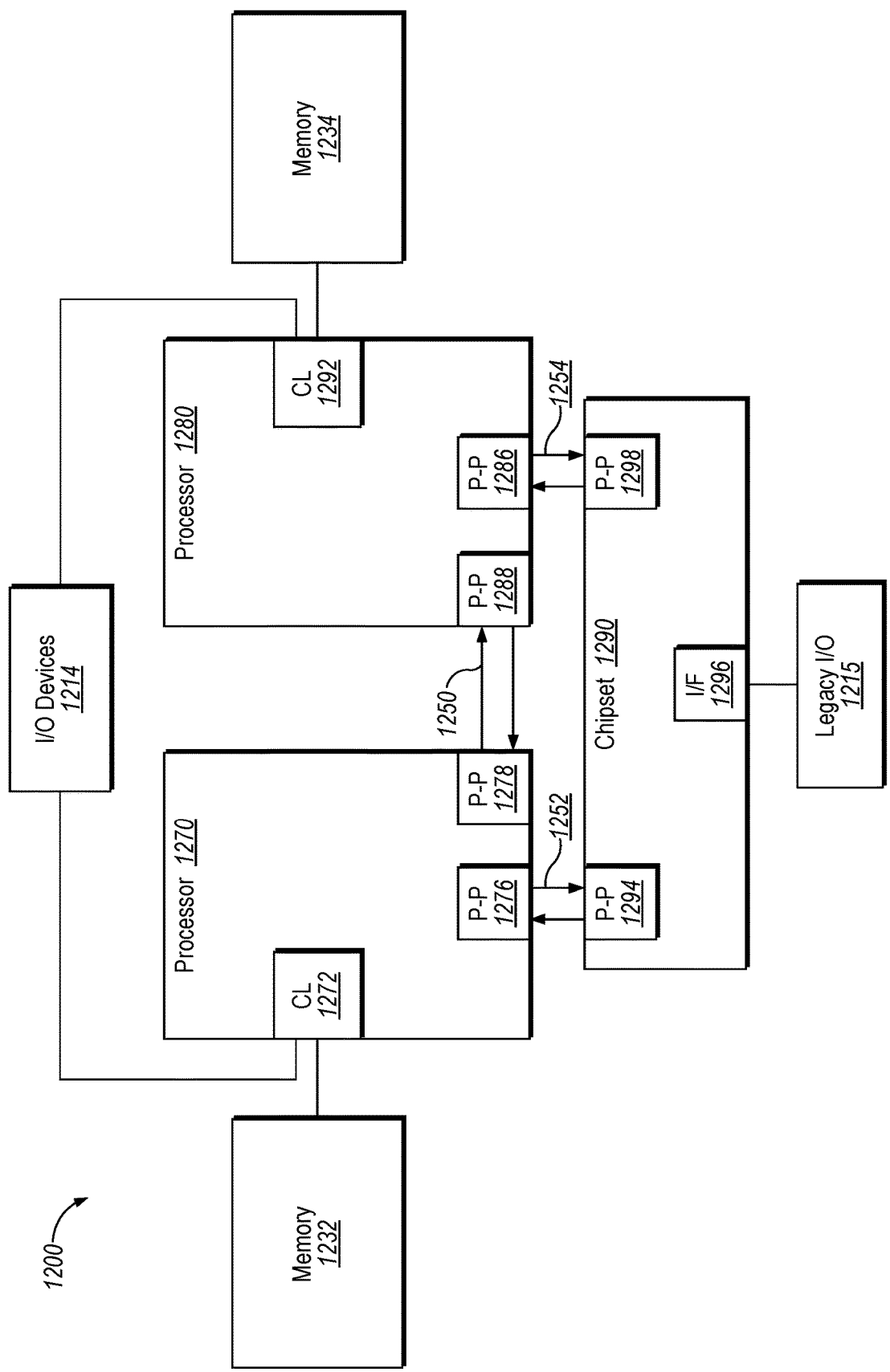
FIG. 12 is a block diagram of a computer system according to another implementation.

Referring now to FIG. 12, shown is a block diagram of a third system 1200 that may implement hardware support for residue error checking, in accordance with an implementation of the disclosure. Like elements in FIGS. 11 and 12 bear like reference numerals and certain aspects of FIG. 12 have been omitted from FIG. 11 in order to avoid obscuring other aspects of FIG. 12.

FIG. 12 illustrates processors 1270, 1280. In one implementation, processors 1270, 1280 may implement hybrid cores as described above. Processors 1270, 1280 may include integrated memory and I/O control logic ("CL") 1272 and 1292, respectively, and intercommunicate with each other via point-to-point interconnect 1250 between point-to-point (P-P) interfaces 1278 and 1288 respectively. Processors 1270, 1280 each communicate with chipset 1290 via point-to-point interconnects 1252 and 1254 through the respective P-P interfaces 1276 to 1294 and 1286 to 1298 as shown. For at least one implementation, the CL 1272, 1282 may include integrated memory controller units such as described herein. In addition, CL 1272, 1292 may also include I/O control logic. FIG. 12 illustrates that the memories 1232, 1234 are coupled to the CL 1272, 1292, and that I/O devices 1214 are also coupled to the control logic 1272, 1292. Legacy I/O devices 1215 are coupled to the chipset 1290 via interface 1296.

Figure 13:
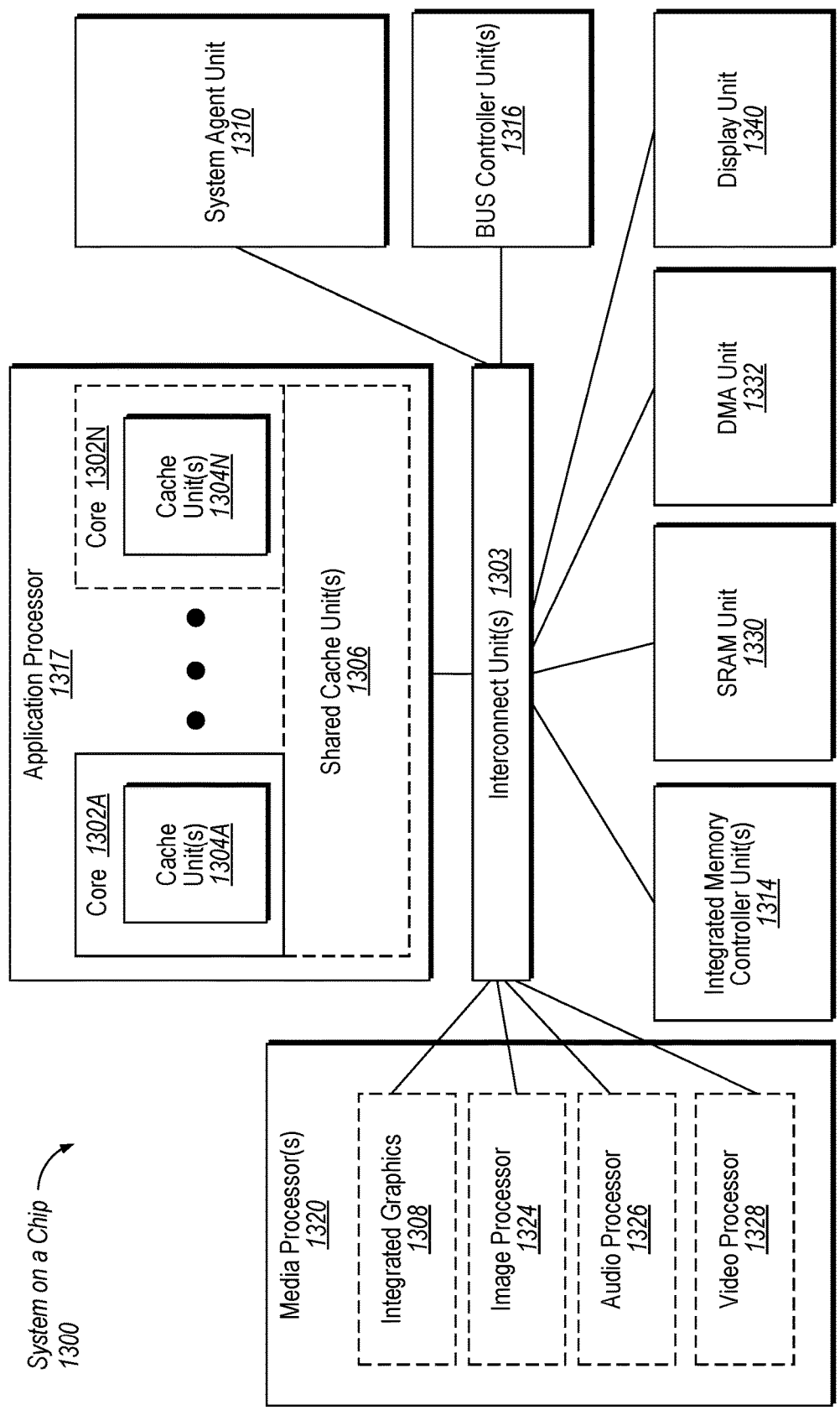
FIG. 13 is a block diagram of a system on a chip according to one implementation.

FIG. 13 is an exemplary system on a chip (SoC) 1300 that may include one or more of the cores 1302A . . . 1302N that may implement hardware support for residue error checking according an implementation. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1300 of FIG. 13, dashed lined boxes are features on more advanced SoCs. An interconnect unit(s) 1303 may be coupled to: an application processor 1317 which includes a set of one or more cores 1302A-N, containing one or more cache unit(s) 1304A . . . 1304N, respectively, and shared cache unit(s) 1306; a system agent unit 1310; a bus controller unit(s) 1316; an integrated memory controller unit(s) 1314; a set of one or more media processors 1320 which may include integrated graphics logic 1308, an image processor 1324 for providing still and/or video camera functionality, an audio processor 1326 for providing hardware audio acceleration, and a video processor 1328 for providing video encode/decode acceleration; a static random access memory (SRAM) unit 1330; a direct memory access (DMA) unit 1332; and a display unit 1340 for coupling to one or more external displays.

Figure 14:
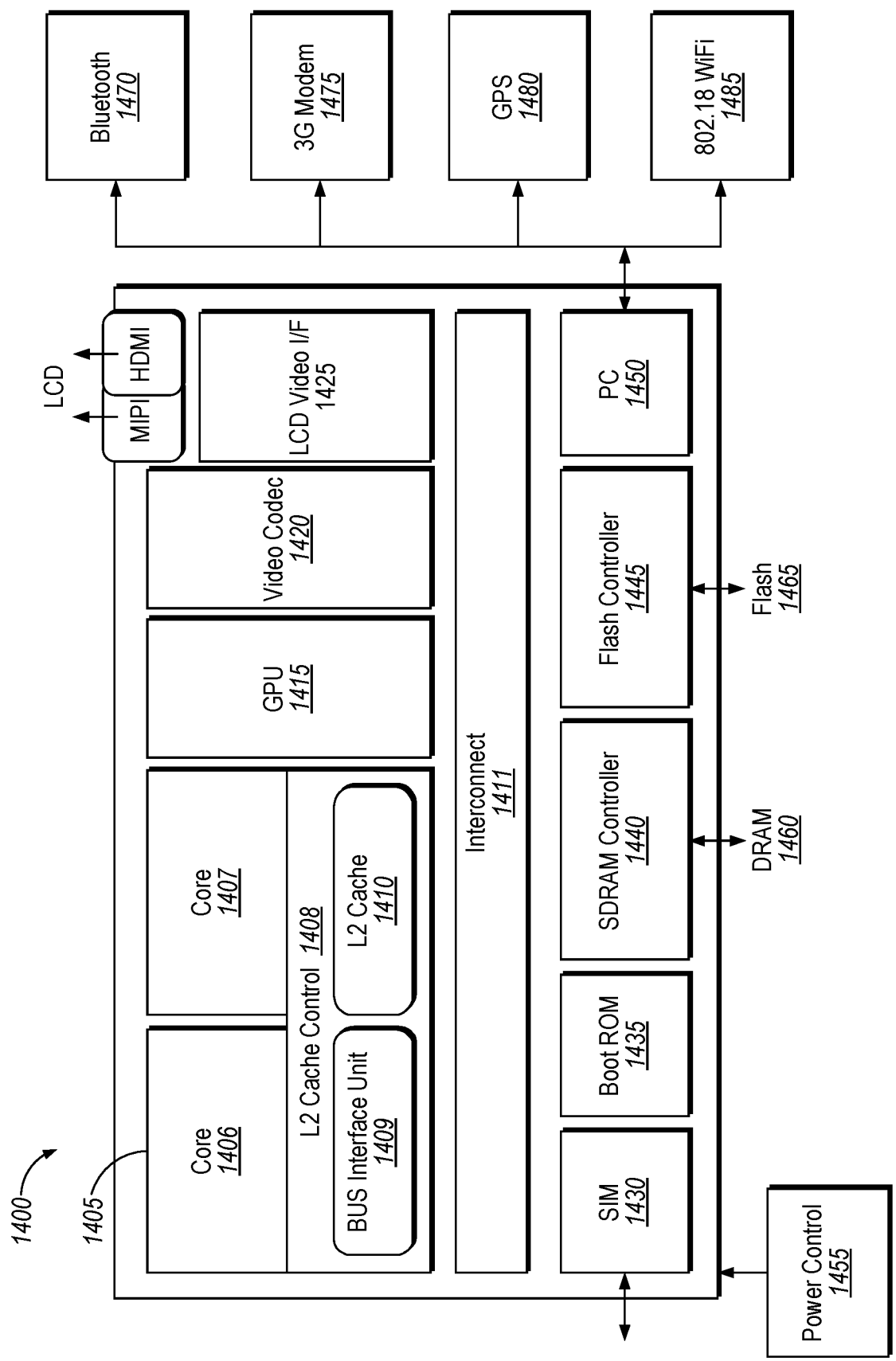
FIG. 14 illustrates another implementation of a block diagram for a computing system.

Turning next to FIG. 14, an implementation of a system on-chip (SoC) design that may implement hardware support for residue error checking, in accordance with implementations of the disclosure is depicted. As an illustrative example, SoC 1400 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the page additions and content copying can be implemented in SoC 1400.

Here, SoC 1400 includes 2 cores—1406 and 1407. Similar to the discussion above, cores 1406 and 1407 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1406 and 1407 are coupled to cache control 1408 that is associated with bus interface unit 1409 and L2 cache 1410 to communicate with other parts of system 1400. Interconnect 1411 includes an on-chip interconnect, such as an IOSF, AMBA, or other interconnects discussed above, which can implement one or more aspects of the described disclosure.

In one implementation, SDRAM controller 1440 may connect to interconnect 1411 via cache 1410. Interconnect 1411 provides communication channels to the other components, such as a Subscriber Identity Module (SIM) 1430 to interface with a SIM card, a boot ROM 1435 to hold boot code for execution by cores 1406 and 1407 to initialize and boot SoC 1400, a SDRAM controller 1440 to interface with external memory (e.g. DRAM 1460), a flash controller 1445 to interface with non-volatile memory (e.g. Flash 1465), a peripheral control 1450 (e.g. Serial Peripheral Interface) to interface with peripherals, video codecs 1420 and Video interface 1425 to display and receive input (e.g. touch enabled input), GPU 1415 to perform graphics related computations, etc. Any of these interfaces may incorporate aspects of the implementations described herein.

In addition, the system illustrates peripherals for communication, such as a power control module 1455, a Bluetooth® module 1470, 3G modem 1475, GPS 1480, and Wi-Fi® 1485. Note as stated above, a UE includes a radio for communication. As a result, these peripheral communication modules may not all be included. However, in a UE some form of a radio for external communication should be included.

Figure 15:
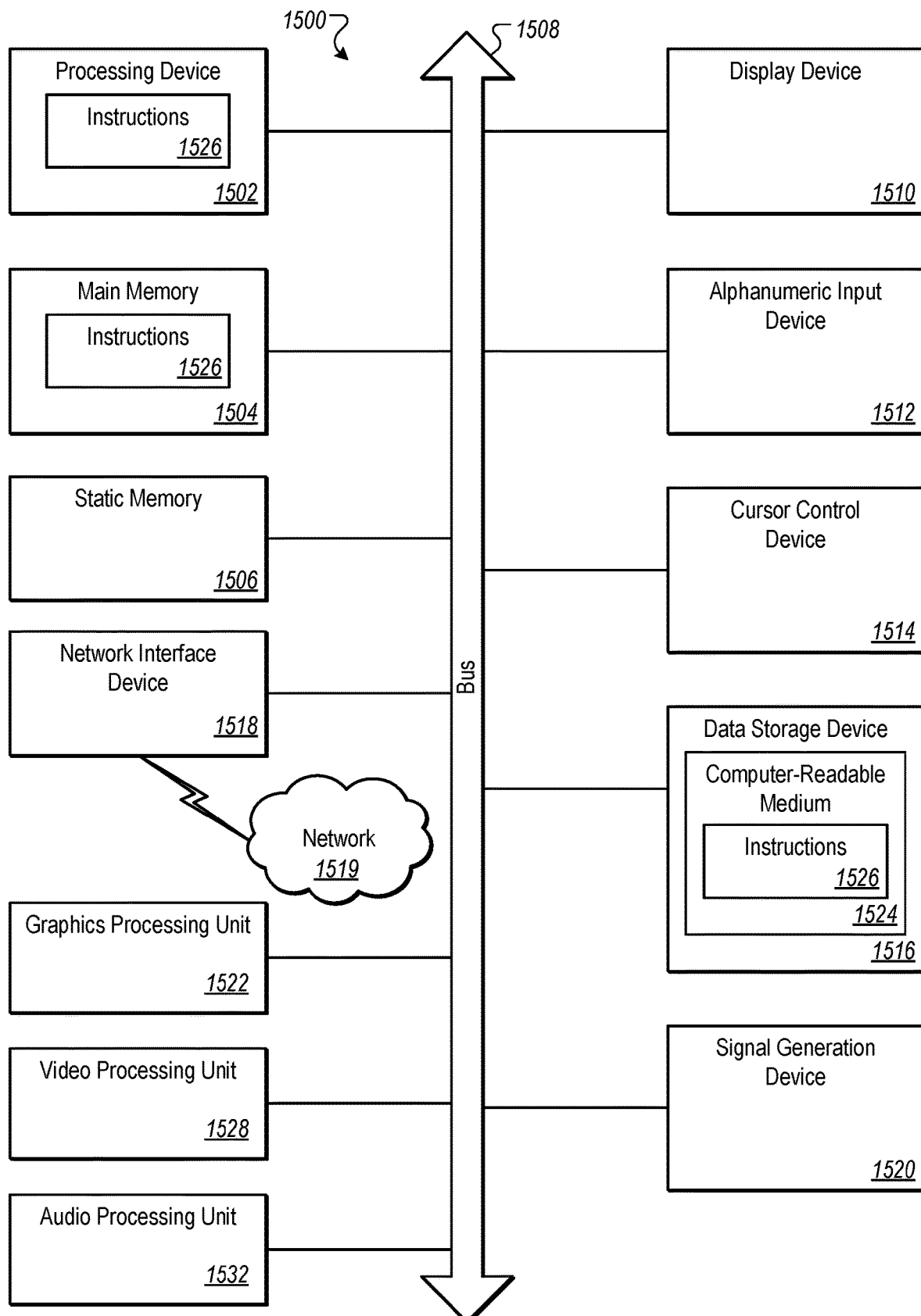
FIG. 15 illustrates another implementation of a block diagram for a computing system.

FIG. 15 illustrates a diagrammatic representation of a machine in the example form of a computing system 1500 within which a set of instructions, for causing the machine to implement hardware support for residue error checking according any one or more of the methodologies discussed herein. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the page additions and content copying can be implemented in computing system 1500.

The computing system 1500 includes a processing device 1502, main memory 1504 (e.g., flash memory, dynamic random access memory (DRAM) (such as synchronous DRAM (SDRAM) or DRAM (RDRAM), etc.), a static memory 1506 (e.g., flash memory, static random access memory (SRAM), etc.), and a data storage device 1516, which communicate with each other via a bus 1508.

Processing device 1502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1502 may also be one or more special-purpose processing devices such as an application-specific integrated circuit (ASIC), a field programmable gate array (FPGA), a digital signal processor (DSP), network processor, or the like. In one implementation, processing device 1502 may include one or more processor cores. The processing device 1502 is configured to execute the processing logic 1526 for performing the operations discussed herein.

In one implementation, processing device 1502 can be part of a processor or an integrated circuit that includes the disclosed LLC caching architecture. Alternatively, the computing system 1500 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1500 may further include a network interface device 1518 communicably coupled to a network 1519. The computing system 1500 also may include a video display device 1510 (e.g., a liquid crystal display (LCD) or a cathode ray tube (CRT)), an alphanumeric input device 1512 (e.g., a keyboard), a cursor control device 1514 (e.g., a mouse), a signal generation device 1520 (e.g., a speaker), or other peripheral devices. Furthermore, computing system 1500 may include a graphics processing unit 1522, a video processing unit 1528 and an audio processing unit 1532. In another implementation, the computing system 1500 may include a chipset (not illustrated), which refers to a group of integrated circuits, or chips, that are designed to work with the processing device 1502 and controls communications between the processing device 1502 and external devices. For example, the chipset may be a set of chips on a motherboard that links the processing device 1502 to very high-speed devices, such as main memory 1504 and graphic controllers, as well as linking the processing device 1502 to lower-speed peripheral buses of peripherals, such as USB, PCI or ISA buses.

The data storage device 1516 may include a computer-readable storage medium 1524 on which is stored software 1526 embodying any one or more of the methodologies of functions described herein. The software 1526 may also reside, completely or at least partially, within the main memory 1504 as instructions 1526 and/or within the processing device 1502 as processing logic during execution thereof by the computing system 1500; the main memory 1504 and the processing device 1502 also constituting computer-readable storage media.

The computer-readable storage medium 1524 may also be used to store instructions 1526 utilizing the processing device 1502, and/or a software library containing methods that call the above applications. While the computer-readable storage medium 1524 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed implementations. The term "computer-readable storage medium" shall accordingly be taken to include, but not be limited to, solid-state memories, and optical and magnetic media.

The following examples pertain to further implementations.

Example 1 is processor comprising: (1) a set of vector registers, each of which is to store a packed vector comprising multiple data elements; and (2) an execution circuit coupled to the set of vector registers, wherein to execute a single instruction, multiple data (SIMD) arithmetic operation, the execution circuit is to: a) receive a first residue code of a first packed vector stored in a first vector register of the set of vector registers; b) receive a second residue code of a second packed vector stored in a second vector register of the set of vector registers; c) calculate, from an addition of the first residue code and the second residue code, a reference residue code for the SIMD arithmetic operation; d) perform an element-by-element execution of the SIMD arithmetic operation between data elements of the first packed vector and of the second packed vector, resulting in an output packed vector; e) calculate an output residue code of the output packed vector; and f) detect an error in the SIMD arithmetic operation based on comparison of the reference residue code with the output residue code.

In Example 2, the processor of Example 1, wherein the execution circuit is further to: a) calculate the first residue code of the first packed vector; and b) calculate the second residue code of the second packed vector.

In Example 3, the processor of Example 1, wherein the SIMD arithmetic operation comprises SIMD addition.

In Example 4, the processor of Example 1, wherein the reference residue code and the output residue code are calculated as the SIMD arithmetic operation, modulo a selected base.

In Example 5, the processor of Example 1, wherein the execution circuit is further to, in response to detection of an overflow condition in the SIMD arithmetic operation, output an indication that error checking passed.

In Example 6, the processor of Example 1, wherein the execution circuit is further to, in response to detection of an overflow condition in the SIMD arithmetic operation, one of subtract one or add two to the reference residue code.

In Example 7, the processor of Example 1, wherein the execution circuit is further to output a failure signal indicative of the detected error.

Various implementations may have different combinations of the structural features described above. For instance, all optional features of the processors and methods described above may also be implemented with respect to a system described herein and specifics in the examples may be used anywhere in one or more implementations.

Example 8 is a method comprising: 1) calculating, by a processor core, a first residue code of a first packed vector stored in a first vector register of a set of vector registers; 2) calculating, by the processor core, a second residue code of a second packed vector stored in a second vector register of the set of vector registers; 3) calculating, by the processor core from an addition of the first residue code and the second residue code, a reference residue code for a single instruction, multiple data (SIMD) arithmetic operation; 4) performing, by the processor core, an element-by-element execution of the SIMD arithmetic operation between data elements of the first packed vector and of the second packed vector, resulting in an output packed vector; 5) calculating, by the processor core, an output residue code of the output packed vector; and 6) detecting, by the processor core, an error in the SIMD arithmetic operation based on comparison of the reference residue code with the output residue code.

In Example 11, the method of Example 10, further comprising outputting a failure signal indicative of the detected error.

In Example 10, the method of Example 8, wherein the data elements in the first and second packed vectors are of different size.

In Example 11, the method of Example 8, wherein the SIMD arithmetic operation comprises SIMD addition.

In Example 12, the method of Example 8, wherein the first residue code, the second residue code, the reference residue code a selected base.

In Example 13, the method of Example 8, further comprising, in response to detecting an overflow condition in the SIMD arithmetic operation, outputting an indication that error checking passed.

In Example 14, the method of Example 8, further comprising, in response to detecting an overflow condition in the SIMD arithmetic operation, one of subtracting one or adding two to the reference residue code.

Various implementations may have different combinations of the structural features described above. For instance, all optional features of the processors and methods described above may also be implemented with respect to a system described herein and specifics in the examples may be used anywhere in one or more implementations.

Example 15 is a system comprising: 1) a decode circuit to decode a single instruction, multiple data (SIMD) instruction; and 2) an execution engine unit coupled to the decode circuit, the execution engine unit comprising: 3) a set of vector registers, each of which is to store a packed vector comprising multiple data elements; and 4) an execution circuit coupled to the set of vector registers, wherein to execute a SIMD arithmetic operation in response to the decoded SIMD instruction, the execution circuit is to: a) receive a first residue code of a first packed vector stored in a first vector register of the set of vector registers; b) receive a second residue code of a second packed vector stored in a second vector register of the set of vector registers; c) calculate, from an addition of the first residue code and the second residue code, a reference residue code for the SIMD arithmetic operation; d) perform an element-by-element execution of the SIMD arithmetic operation between data elements of the first packed vector and of the second packed vector, resulting in an output packed vector; e) calculate an output residue code of the output packed vector; and f) detect an error in the SIMD arithmetic operation based on comparison of the reference residue code with the output residue code.

In Example 16, the system of Example 15, wherein the execution circuit is further to: a) calculate the first residue code of the first packed vector; and b) calculate the second residue code of the second packed vector.

In Example 17, the system of Example 15, wherein the SIMD arithmetic operation comprises SIMD addition.

In Example 18, the system of Example 15, wherein the reference residue code and the output residue code are calculated as the SIMD arithmetic operation, modulo a selected base.

In Example 19, the system of Example 15, wherein the execution circuit is further to, in response to detection of an overflow condition in the SIMD arithmetic operation, output an indication that error checking passed.

In Example 20, the system of Example 15, wherein the execution circuit is further to, in response to detection of an overflow condition in the SIMD arithmetic operation, one of subtract one or add two to the reference residue code.

In Example 21, the system of Example 15, wherein the execution circuit is further to output a failure signal indicative of the detected error.

Various implementations may have different combinations of the structural features described above. For instance, all optional features of the processors and methods described above may also be implemented with respect to a system described herein and specifics in the examples may be used anywhere in one or more implementations.

Example 22 is a non-transitory computer readable medium storing instructions, which when executed by a processor, cause the processor to perform a plurality of operations comprising: 1) calculating, by a processor core, a first residue code of a first packed vector stored in a first vector register of a set of vector registers; 2) calculating, by the processor core, a second residue code of a second packed vector stored in a second vector register of the set of vector registers; 3) calculating, by the processor core from an addition of the first residue code and the second residue code, a reference residue code for a single instruction, multiple data (SIMD) arithmetic operation; 4) performing, by the processor core, an element-by-element execution of the SIMD arithmetic operation between data elements of the first packed vector and of the second packed vector, resulting in an output packed vector; 5) calculating, by the processor core, an output residue code of the output packed vector; and 6) detecting, by the processor core, an error in the SIMD arithmetic operation based on comparison of the reference residue code with the output residue code.

In Example 23, the non-transitory computer readable medium of Example 22, wherein the plurality of operations further comprise outputting a failure signal indicative of the detected error.

In Example 24, the non-transitory computer readable medium of Example 22, wherein the data elements in the first and second packed vectors are of different size.

In Example 25, the non-transitory computer readable medium of Example 22, wherein the SIMD arithmetic operation comprises SIMD addition.

In Example 26, the non-transitory computer readable medium of Example 22, wherein the first residue code, the second residue code, the reference residue code, and the output residue code are calculated as the SIMD arithmetic operation, modulo a selected base.

In Example 27, the non-transitory computer readable medium of Example 22, further comprising, in response to detecting an overflow condition in the SIMD arithmetic operation, outputting an indication that error checking passed.

In Example 28, the non-transitory computer readable medium of Example 22, further comprising, in response to detecting an overflow condition in the SIMD arithmetic operation, one of subtracting one or adding two to the reference residue code.

Various implementations may have different combinations of the structural features described above. For instance, all optional features of the processors and methods described above may also be implemented with respect to a system described herein and specifics in the examples may be used anywhere in one or more implementations.

Example 29 is a system comprising: 1) means for calculating a first residue code of a first packed vector stored in a first vector register of a set of vector registers; 2) means for calculating a second residue code of a second packed vector stored in a second vector register of the set of vector registers; 3) means for calculating an addition of the first residue code and the second residue code, a reference residue code for a single instruction, multiple data (SIMD) arithmetic operation; 4) means for performing an element-by-element execution of the SIMD arithmetic operation between data elements of the first packed vector and of the second packed vector, resulting in an output packed vector; 5) means for calculating an output residue code of the output packed vector; and 6) means for detecting an error in the SIMD arithmetic operation based on comparison of the reference residue code with the output residue code.

In Example 30, the system of Example 29, further comprising means for comprising outputting a failure signal indicative of the detected error.

In Example 31, the system of Example 29, wherein the data elements in the first and second packed vectors are of different size.

In Example 32, the system of Example 29, wherein the SIMD arithmetic operation comprises SIMD addition.

In Example 33, the system of Example 29, wherein the first residue code, the second residue code, the reference residue code, and the output residue code are calculated as the SIMD arithmetic operation, modulo a selected base.

In Example 34, the system of Example 29, further comprising, in response to detecting an overflow condition in the SIMD arithmetic operation, means for outputting an indication that error checking passed.

In Example 35, the system of Example 29, further comprising, in response to detecting an overflow condition in the SIMD arithmetic operation, one of means for subtracting one or adding two to the reference residue code.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, to one skilled in the art that these specific details need not be employed to practice the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the disclosure.

The implementations are described with reference to determining validity of data in cache lines of a sector-based cache in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the disclosure can be applied to other types of circuits or semiconductor devices that can benefit from higher pipeline throughput and improved performance. The teachings of implementations of the disclosure are applicable to any processor or machine that performs data manipulations. However, the disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the above examples describe instruction handling and distribution in the context of execution units and logic circuits, other implementations of the disclosure can be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions can be used to cause a general-purpose or special-purpose processor that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and/or 'operable to,' in one implementation, refers to some apparatus, logic, hardware, and/or element designed in such a way to enable use of the apparatus, logic, hardware, and/or element in a specified manner. Note as above that use of 'to,' capable to,' or 'operable to,' in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010b and a hexadecimal letter 0xA. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a set of vector registers, each of which is to store a packed vector comprising multiple data elements; and
   an execution circuit coupled to the set of vector registers, wherein to execute a single instruction, multiple data (SIMD) arithmetic operation, the execution circuit is to:
   receive a first residue code of a first packed vector stored in a first vector register of the set of vector registers;
   receive a second residue code of a second packed vector stored in a second vector register of the set of vector registers;
   calculate, from an addition of the first residue code and the second residue code, a reference residue code for the SIMD arithmetic operation;
   perform an element-by-element execution of the SIMD arithmetic operation between data elements of the first packed vector and of the second packed vector, resulting in an output packed vector;
   calculate an output residue code of the output packed vector; and
   detect an error in the SIMD arithmetic operation based on comparison of the reference residue code with the output residue code.

2. The processor of claim 1, wherein the execution circuit is further to:
   calculate the first residue code of the first packed vector; and
   calculate the second residue code of the second packed vector.

3. The processor of claim 1, wherein the SIMD arithmetic operation comprises SIMD addition.

4. The processor of claim 1, wherein the reference residue code and the output residue code are calculated as the SIMD arithmetic operation, modulo a selected base.

5. The processor of claim 1, wherein the execution circuit is further to, in response to detection of an overflow condition in the SIMD arithmetic operation, output an indication that error checking passed.

6. The processor of claim 1, wherein the execution circuit is further to, in response to detection of an overflow condition in the SIMD arithmetic operation, one of subtract one or add two to the reference residue code.

7. The processor of claim 1, wherein the execution circuit is further to output a failure signal indicative of the detected error.

8. A method comprising:
   calculating, by a processor core, a first residue code of a first packed vector stored in a first vector register of a set of vector registers;
   calculating, by the processor core, a second residue code of a second packed vector stored in a second vector register of the set of vector registers;
   calculating, by the processor core from an addition of the first residue code and the second residue code, a reference residue code for a single instruction, multiple data (SIMD) arithmetic operation;
   performing, by the processor core, an element-by-element execution of the SIMD arithmetic operation between data elements of the first packed vector and of the second packed vector, resulting in an output packed vector;
   calculating, by the processor core, an output residue code of the output packed vector; and
   detecting, by the processor core, an error in the SIMD arithmetic operation based on comparison of the reference residue code with the output residue code.

9. The method of claim 8, further comprising outputting a failure signal indicative of the detected error.

10. The method of claim 8, wherein the data elements in the first and second packed vectors are of different size.

11. The method of claim 8, wherein the SIMD arithmetic operation comprises SIMD addition.

12. The method of claim 8, wherein the first residue code, the second residue code, the reference residue code, and the output residue code are calculated as the SIMD arithmetic operation, modulo a selected base.

13. The method of claim 8, further comprising, in response to detecting an overflow condition in the SIMD arithmetic operation, outputting an indication that error checking passed.

14. The method of claim 8, further comprising, in response to detecting an overflow condition in the SIMD arithmetic operation, one of subtracting one or adding two to the reference residue code.

15. A system comprising:
   a decode circuit to decode a single instruction, multiple data (SIMD) instruction; and
   an execution engine unit coupled to the decode circuit, the execution engine unit comprising:
   a set of vector registers, each of which is to store a packed vector comprising multiple data elements; and
   an execution circuit coupled to the set of vector registers, wherein to execute a SIMD arithmetic operation in response to the decoded SIMD instruction, the execution circuit is to:
   receive a first residue code of a first packed vector stored in a first vector register of the set of vector registers;
   receive a second residue code of a second packed vector stored in a second vector register of the set of vector registers;
   calculate, from an addition of the first residue code and the second residue code, a reference residue code for the SIMD arithmetic operation;
   perform an element-by-element execution of the SIMD arithmetic operation between data elements of the first packed vector and of the second packed vector, resulting in an output packed vector;
   calculate an output residue code of the output packed vector; and
   detect an error in the SIMD arithmetic operation based on comparison of the reference residue code with the output residue code.

16. The system of claim 15, wherein the execution circuit is further to:
   calculate the first residue code of the first packed vector; and
   calculate the second residue code of the second packed vector.

17. The system of claim 15, wherein the SIMD arithmetic operation comprises SIMD addition.

18. The system of claim 15, wherein the reference residue code and the output residue code are calculated as the SIMD arithmetic operation, modulo a selected base.

19. The system of claim 15, wherein the execution circuit is further to, in response to detection of an overflow condition in the SIMD arithmetic operation, output an indication that error checking passed.

20. The system of claim 15, wherein the execution circuit is further to, in response to detection of an overflow condition in the SIMD arithmetic operation, one of subtract one or add two to the reference residue code.

21. The system of claim 15, wherein the execution circuit is further to output a failure signal indicative of the detected error.

* * * * *